US006189023B1

(12) United States Patent
Emlich et al.

(10) Patent No.: US 6,189,023 B1
(45) Date of Patent: Feb. 13, 2001

(54) SIMULATING SHARED CODE THREAD MODULES WITH SHARED CODE FIBERS

(75) Inventors: Larry W. Emlich, San Jose; Srini Brahmaroutu, Cupertino, both of CA (US)

(73) Assignee: Tandem Computers Incorporated, Cupertino, CA (US)

( * ) Notice: Under 35 U.S.C. 154(b), the term of this patent shall be extended for 0 days.

(21) Appl. No.: 08/941,124

(22) Filed: Sep. 30, 1997

(51) Int. Cl.[7] .................................................... G06F 17/30
(52) U.S. Cl. ............................................................ 709/100
(58) Field of Search ............................ 395/670; 709/100

(56) References Cited

U.S. PATENT DOCUMENTS

| | | | |
|---|---|---|---|
| 4,989,134 | * | 1/1991 | Shaw . |
| 5,404,529 | * | 4/1995 | Chernikoff . |
| 5,481,706 | * | 1/1996 | Peck . |
| 5,553,305 | * | 9/1996 | Gregor et al. . |
| 5,557,747 | * | 9/1996 | Roger . |
| 5,630,128 | * | 5/1997 | Farrell . |
| 5,784,613 | * | 7/1998 | Iamirisa . |
| 5,835,763 | * | 11/1998 | Klein . |

FOREIGN PATENT DOCUMENTS 0794 490    9/1997    (EP) ................................. G06F/9/46

OTHER PUBLICATIONS

Xuejun et al, "Processor Self–Scheduling for Parallel Loops in Preemptive Environments," *Future Generations Computer Systems*, 6 (1990) Jun. , No. 1, Amsterdam, NL, pp. 97–103, Elsevier Science Publishers B.V. North–Holland.
Yam M: "DCE pthreads versus NT Threads," *Dr. Dobb's Journal*, Dec. 1996, Miller Freeman, U.S.A., vol. 21, No. 12, pp. 16–18, 20, 88.

* cited by examiner

*Primary Examiner*—Alvin E. Oberley
*Assistant Examiner*—George Opie
(74) *Attorney, Agent, or Firm*—Townsend and Townsend and Crew LLP

(57)    ABSTRACT

A computer program product simulates shared code threads with Windows NT fibers. Computer code is included for reusing shared code threads which complete.

5 Claims, 4 Drawing Sheets

SIMULATING SHARED CODE THREAD MODULES WITH SHARED CODE FIBERS

BACKGROUND OF THE INVENTION

Many modern operating systems utilize threads as the basic unit of execution. Each thread in a process is associated with a sequence of CPU instructions, a set of CPU registers and a stack.

The operating system is responsible for scheduling threads. Different operating systems perform thread scheduling and thread synchronization in different manners. Thus, application programs are designed to utilize the thread scheduling protocols of the operating system. If the application is to be run on a different operating system care must be taken to account for different thread management protocols.

In some cases special software may be written to port applications to another operating system. The porting application presents a consistent set of application program interfaces (APIs) application programs and includes functions to generate instructions to cause the new operating system to transparently provide the support expected by the application programs written for the original operating system.

SUMMARY OF THE INVENTION

According to one aspect of the invention, a computer program product ports the NSK shared code threads to the Windows NT operating system.

According to another aspect of the invention, a shared code thread is implemented as an NT fiber. The fibers within a thread are not preempted and are used to implement the scheduling protocols of the shared code threads.

According to another aspect of the invention, when a shared code thread completes it may be put on a free thread list to be reused when a new shared thread is to be created.

DETAILED DESCRIPTION OF THE PREFERRED EMBODIMENTS

The implementation of shared-code threads will be described with reference to the source doe module cthread.cpp, written in C++, and the header file nthreadz.h (listed below). These modules are implemented specifically to port the shared-thread module included in the proprietary Transaction Management Facility (TMF) to a system utilizing MicroSoft Windows NT as an operating system.

Overview

Figure 1:
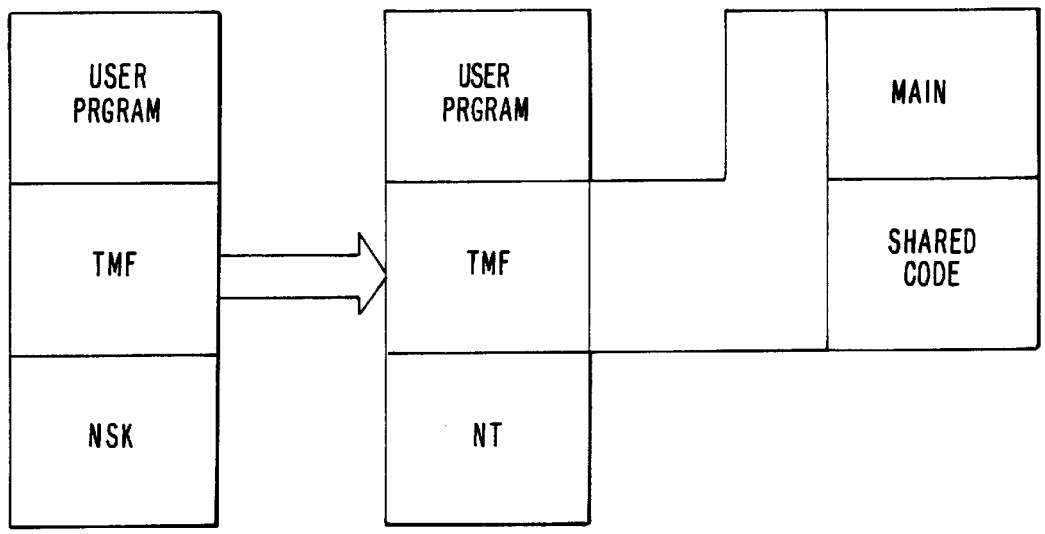
FIG. 1 is a block diagram of systems using NSK and Windows NT as operation systems.

As depicted in FIG. 1, in a proprietary Tandem machine the operating system is the Non-Stop Kernal (NSK). The TMF was originally designed to operate with NSK as the operating system. User programs developed to run with TMF utilize a standard API to utilize many services provided by TMF including database services and a shared-code thread module.

The software hierarchy of a computer utilizing Windows NT is depicted. The TMF must be ported to the new operating system so that user programs designed to utilize the existing TMF API do not need to be recompiled. The present invention is directed to porting the shared code module of TMF to Windows NT.

A primary goal of this porting project is to keep the existing API so that the modules that use shared code threads will not have to be modified. A secondary goal is to preserve the existing data structures to reduce development and debugging time.

The low-level thread management code will be quite different on Windows NT. At first glance, it would appear that a shared code thread could simply become an NT thread. The problem with this approach is that an NT thread can be switched by the operating system to any other thread in any process at any time. Shared code threads control their own scheduling and therefore do not synchronize between themselves. However, Windows NT version 4.0 implements fibers, a non-preemptive thread facility that gives the kind of control needed for shared code threads.

An NT fiber is preempted just like any NT thread, but the NT operating system cannot switch to another fiber of that thread. Whatever fiber was running when a thread is preempted will run again when that thread regains control. A fiber, like a shared code thread, must voluntarily give up control if another fiber within that NT thread is to run.

Moving shared code threads to NT causes a documentation problem in that the term thread must now be preceded by some kind of adjective. A shared code thread (SCT) is actually implemented as an NT fiber. An NT thread is the basic unit of execution on the Windows NT system and is scheduled by the operating system.

1. Detailed Description of Shared Code Thread Operation On NT

Figure 2:
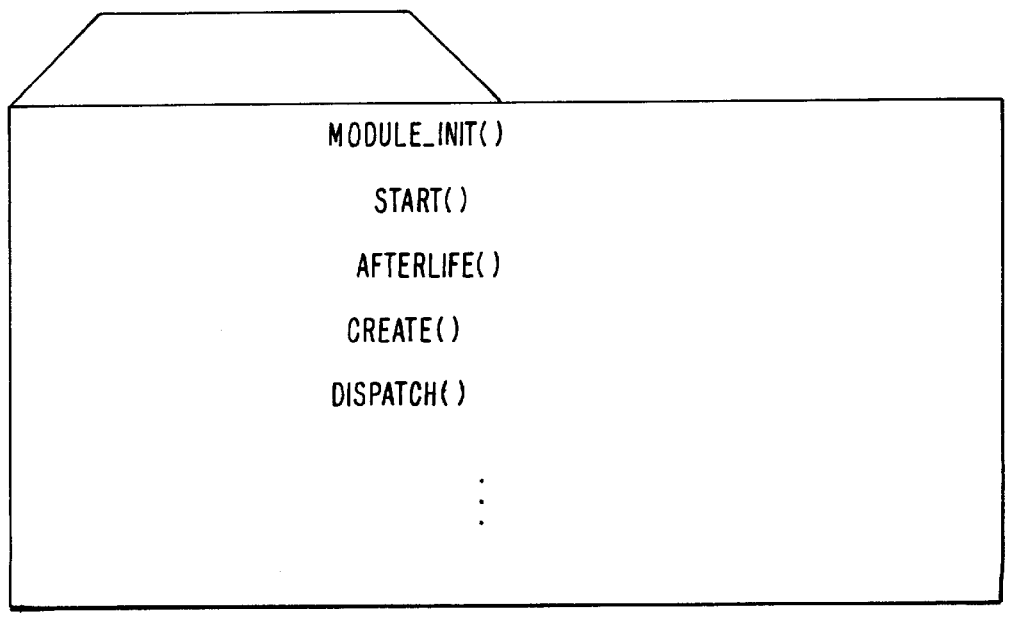
FIG. 2 is a schematic diagram of the shared code module.

FIG. 2 is a schematic depiction of the shared code module for porting shared code module with some of the functions for porting the module to Windows NT. The operations performed by these functions will be described below.

Figure 3:
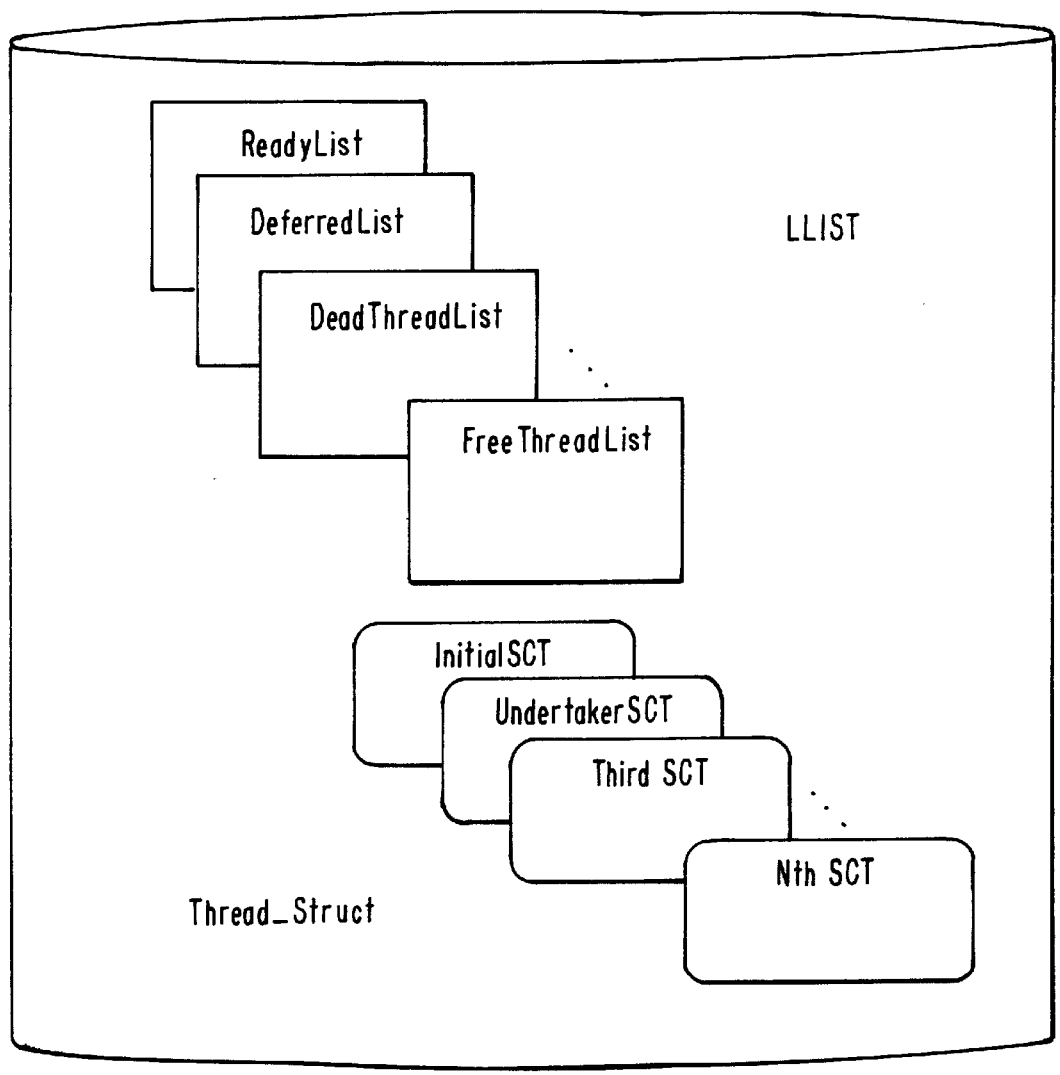
FIG. 3 is block diagram of the lists and structures stored in memory.

Important data structures, stored in memory 30, are depicted in FIG. 3. An LList module creates lists which are utilized by the functions in the shared code module. The Create function creates data structures for each shared code thread.

Figure 4:
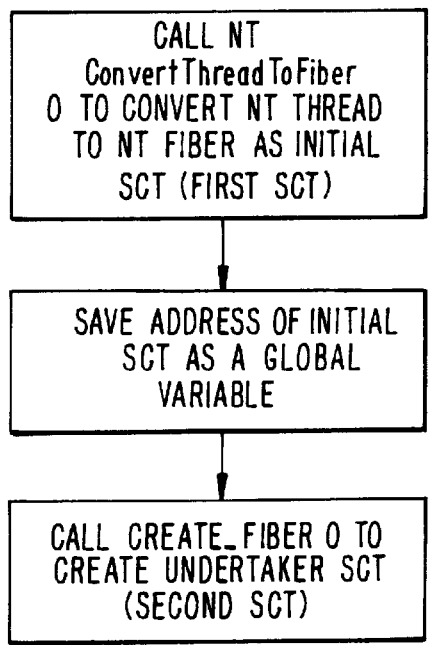
FIG. 4 is a flowchart depicting steps implemented by the Module_Init( ) function.

The Thread_ModuleInit function on Windows NT does nearly the same work as it does under NSK. The operation of this function is conceptually depicted in the flowchart of FIG. 4. The function simply allocates and initializes global storage, using the caller-specified heap. It also converts the current thread to a fiber with a call to the NT function ConvertThreadToFiber.

After calling Thread_ModuleInit, an application calls the shared code thread function Thread_Create once for each desired shared code thread. The operation of Thread_Create is conceptually depicted in the flow chart of FIG. 5. In the NT version of the shared code thread module, the Thread_create function will first create a Thread_Struct structure, then call the NT function CreateFiber passing a pointer to the shared code Thread_Start fiber function as argument 1 and a pointer to the Thread_Struct structure as argument 2.

The shared code Thread_Start function is necessary on NT for two reasons:

1. In NT, when an application terminates (returns from WinMain) NT destroys the thread. Shared code thread procedures might return in order to terminate the thread. If a fiber returns, the NT thread itself will exit prematurely. To avoid this, the Thread_Start fiber function never returns. If the caller's shared code procedure returns, the Thread_Start function marks the fiber deleted, then switches to the initial fiber (created by the Thread_Dispatch function) which can return safety to the caller of Thread_Dispatch if there are no more fibers on the ready list.
2. Shared code thread procedures can have one or two parameters. Fiber functions have only one parameter, the fiber data. The Thread_Start fiber function finds the actual shared code thread procedure and all arguments in the Thread_Struct structure.

The module cthreadz.cpp (with header file nthreadz.h) utilizes NT fibers to implement a multi-threaded mechanism, known as shared code threads, that can be managed by a user application or general facility. As described above, NT implements preemptive multi-taking and threads are started and stopped by the operating system at arbitrary times. This is not an acceptable threading model for applications that want to control how threads are scheduled, avoid synchronization issues, and minimize expensive context switches.

A fiber facility, provided by NT, makes it possible to divide a single Win32 thread into multiple non-preemptive units of execution known as fibers. Like the Win32 thread, each fiber has its own stack and main routine. Unlike the Win32 thread, it cannot be preempted by other fibers within the same Win32 thread. When a shared code thread wishes to relinquish control, it simply executes the NT SwitchToFiber call. Note that every fiber is a member of one and only one Win32 thread which can be suspended by the operating system at any time, suspending, in turn, whatever fiber happens to be running at the time. For these reasons all shared code threads of a single process must exist in one and only one Win32 thread in that process.

The user application or general facility calls the cthreadz module to create shared code threads and run them as fibers. Once running, a fiber calls functions in the cthreadz module to create other shared code threads, schedule them to run, and suspend itself.

Figure 5:
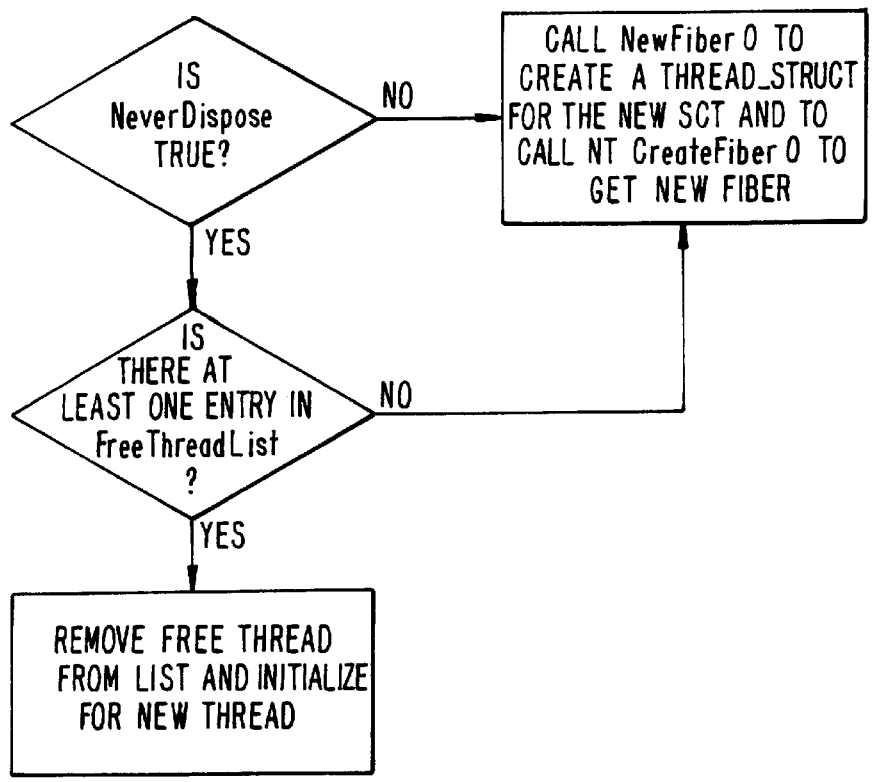
FIG. 5 is a flowchart depicting steps implemented by the Create( ) function.

2. Detailed Description of the Functions
Examine the Thread_ModuleInit function in cthreadz.cpp The user of the shared code thread module must call Thread_ModuleInit (FIG. 4) before using any other shared code thread functions. Within this function, the current Win32 thread is converted to an NT fiber. This first fiber is known as the initial fiber and is responsible for executing all fibers that may subsequently be created when a new shared code thread is created. The address of this first fiber is saved in the global variable, ThreadG( ).Initial_Fiber, so that it can be retrieved whenever a shared code thread suspends or completes. Before returning to the caller, Thread_ModuleInit creates the first shared code thread (and the second fiber) via Thread_Create. FIG. 5 is a flowchart depicting the operation of Thread_Create. This first shared code thread is the undertaker thread, which is responsible for deleting (burying) shared code threads and their associated fibers after their main routine returns. If the argument NeverDispose is TRUE, the variable ThreadG( ).NeverDispose is set to TRUE so that the cthreadz module remembers to reuse existing fibers for new shared code threads.

As shown in Thread_ModuleInit, a shared code thread is represented by a structure (Thread_Struct) which contains information about the thread (including the fiber address) and linkage blocks for insertion into various lists. If a shared code thread is runnable, for example, it is added to the end of the Thread_ReadyList. Lower priority runnable threads can be placed on the Thread_DeferredReadyList If ThreadG( ).NeverDispose was set to TRUE in Thread_ModuleInit, a completed Thread_Struct will be placed on the FreeThreadList; otherwise, it will go to the DeadThreadList.

Examine the Thread_Start function in cthreadz.cpp
As described above, the shared code Thread_Start function is necessary on NT for two reasons:
  I. Shared code thread procedures might return in order to terminate the thread. If a fiber returns, the NT thread itself will exit prematurely. To avoid this, the Thread_Start fiber function never returns. If the caller's shared code procedure returns, the Thread_Start function marks the fiber deleted, then switches to the initial fiber (created by the Thread_Dispatch function) which can return safely to the caller of Thread_Dispatch if there are no more fibers on the ready list.
  II. Shared code thread procedures can have one or two parameters. Fiber functions have only one parameter, the fiber data. The Thread_Start fiber function finds the actual shared code thread procedure and all arguments in the Thread_Struct structure.

Figure 6:
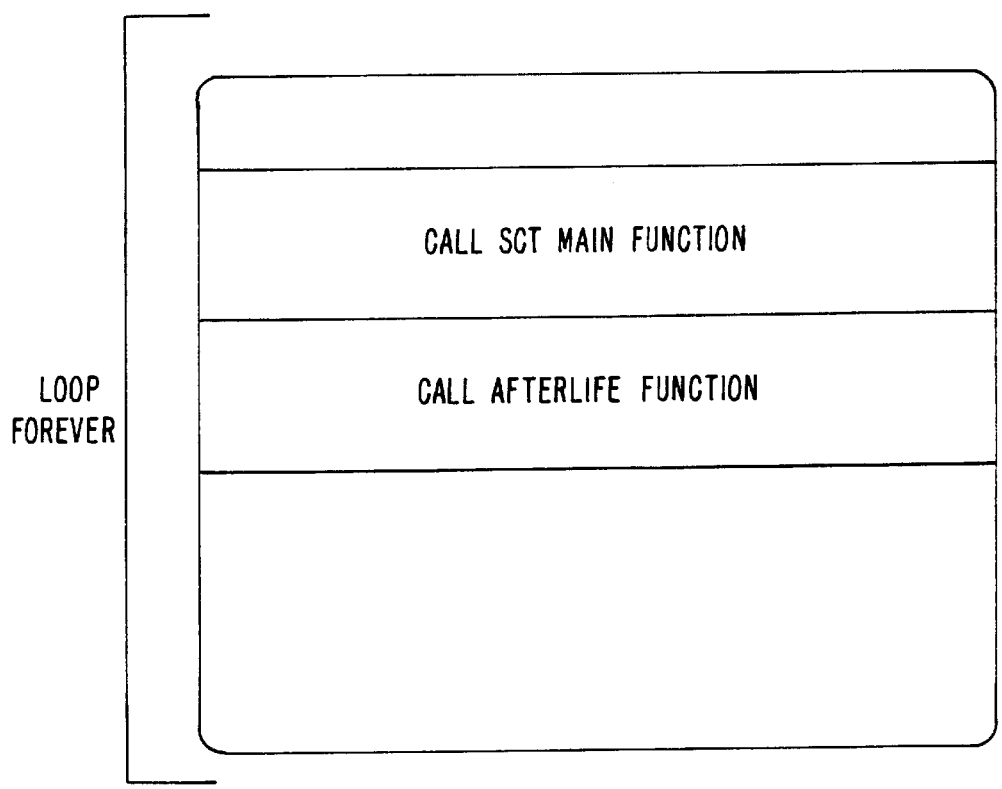
FIG. 6 is a schematic diagram of the structure of the Thread_Start( ) function.

An NT fiber has an associated function (main routine) that will be executed when the first NT SwitchToFiber call is made after creation of the fiber. In the cthreadz module, all fibers use the Thread_Start function as their main routine, which is specified in the call to the NT CreateFiber function from the NewFiber function in cthreadz.cpp. As depicted in FIG. 6, Thread_Start is a wrapper around the user-specified shared code thread main routine (saved in Thread_Struct by Thread_Create). Inside an infinite loop, it simply calls the current shared code thread main routine and then calls Thread_AfterLife after that function returns to the caller. This infinite loop makes it possible for the fiber to be reused because the fiber function (Thread_Start) never actually returns to the caller. If Thread_AfterLife places the Thread_Struct on the FreeThreadList, it may eventually be used for a new thread. When and if that happens, a new shared code thread main routine pointer will be placed in Thread_Struct and a SwitchToFiber call will allow the fiber main routine to return from Thread_AfterLife and perform another loop iteration.

Figure 7:
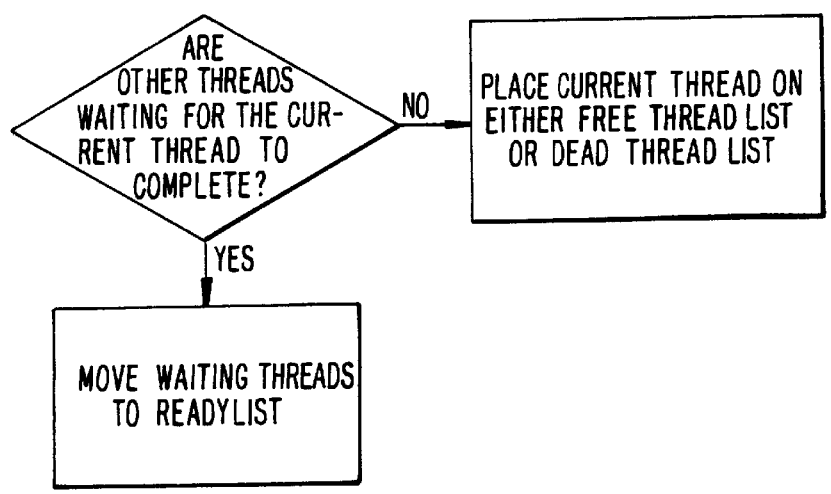
FIG. 7 is a flowchart depicting steps implemented by the Afterlife( ) function.

Examine the Thread_AfterLife function in cthreadz.cpp
A shared code thread main routine only returns when it is completely finished. The Thread_Afterlife function then decides what to do with the current fiber. The operation of this function is conceptually depicted in the flowchart FIG. 7. If other threads are waiting for this thread to complete, those threads are moved from the WaitList in the current Thread_Struct to the Thread_ReadyList by a call to Thread_ScheduleList (explained later), and the current thread is suspended.

Examine the Thread_WaitForExit function in cthreadz.cpp
When a shared code thread wishes to wait for another shared code thread to complete, it calls Thread_WaitForExit which adds the current thread to the WaitList of the thread to wait for unless that thread is already marked complete. The current thread suspends (via Thread_SuspendOnList) and runs again only after the target thread completes when Thread_AfterLife schedules all the threads that are waiting on it. When the waiting thread resumes and finds that the target thread has completed, it decrements the wait count for the target thread (WaiterCount in Thread_Struct). When the last waiting thread decrements the count to zero, it schedules the target thread to run so that Thread_AfterLife can finish getting rid of it.

Return to Thread_AfterLife in cthreadz.cpp

When the wait count for the completed thread reaches zero, indicating that all waiting threads have stopped waiting, the completed thread eventually resumes and breaks out of the loop because there are no more waiting threads. Thread_AfterLife then calls Thread_SuspendOnList to place the current thread on either the DeadThreadList or the FreeThreadLIst before allowing other threads to run.

As explained earlier, the FreeThreadList is used when the calling program wishes to keep a cache of fibers for use by new shared code threads. If the calling program uses the DeadThreadList, fibers will be deleted when the shared code thread main routine returns. Obviously, the FreeThreadList approach is faster, but it also uses more virtual memory. If it is used, the Thread_Afterlife function will return to the Thread_Start routine when the shared code thread structure is taken off the list and initialized for a new thread. Note that, when the FreeThreadList is used, a single fiber can be used for multiple shared code threads (one at a time), and the fiber main routine, Thread_Start, never returns. On the other hand, if the DeadThreadList is in use, the Thread_Afterlife function never returns because the fiber is deleted before it can run again.

Examine Thread_Undertaker in cthreadz.cpp

When the DeadThreadList is in use (ThreadG.( ).Dispose is TRUE), the Thread_Afterlife function places the undertaker thread on the Thread_DeferredReadyList so that it will run only after all runnable threads have suspended or completed. The undertaker thread main routine, Thread_Undertaker, removes the structure and deletes the associated fiber for each shared code thread on the DeadThreadList by calling Thread_Dispose which, in turn, calls the NT DeleteFiber function to completely remove the fiber and reclaim the stack space. Note that the fiber main routine Thread_Start never completes for any fiber because it is either never again executed (when NeverDispose is FALSE) or iterates for another shared code thread (when NeverDispose is TRUE).

Examine the Thread_Create function in cthreadz.cpp

The Thread_Create function is called by the user application or general facility to create a new shared code thread. If the FreeThreadList is in use and contains at least one entry, indicating that at least one thread has run to completion, the first Thread_Struct is removed from the list and initialized for the new thread, keeping the existing fiber pointer. When control is passed to this thread (in Thread_Dispatch), it will return to the fiber main routine, Thread_start, from Thread_AfterLife and execute the new shared code thread main routine in Thread_Struct. If the FreeThreadList is not in use or is empty, the NewFiber function in cthreadz.cpp is called to create a new Thread_Struct for the thread and to call the NT function CreateFiber to get a new fiber from the operating system. Whether or not the Thread_Struct came from the FreeThreadList, the shared code thread main routine pointer in the Thread_Struct will now point to the new thread main routine. After initializing the Thread_Struct, the Thread_create function places it at the end of the Thread_ReadyList, making the new thread runnable.

Examine the Thread_Dispatch function in cthreadz.cpp

When the calling program wishes to pass control to all runnable shared code threads, it calls Thread_Dispatch. This function will not return until all fibers are suspended or finished. It always runs in the initial fiber (created by Thread_ModuleInit) and uses the NT SwitchToFiber function to execute shared code threads. The Thread_ReadyList is checked first. If no shared code threads are on this list, the Thread_DeferredReadyList is checked. Note that the undertaker thread will be one of the threads on the Thread_Deferred ReadyList if the DeadThreadList is in use (NeverDispose is FALSE) and at lease one shared code thread has completed. When Thread_Dispatch returns, indicating that no shared code threads are runnable, the calling program usually does something to make them runnable (processes pending I/O completions, for example) or creates new threadsbefore calling Thread_Dispatch again. Note that, when all threads are blocked, the calling program must either create new threads (with Thread_Create) or schedule existing threads (with Thread_Schedule) to keep Thread_Dispatch busy.

Examine the Thread_SuspendOnList function in cthreadz.cpp

It is incumbent upon the shared code thread to ensure that it can somehow be re-scheduled after it suspends itself. The simplest way to do that is to use Thread_SuspendOnList, specifying a list that some other entity will later pass to Thread_ScheduleList to place all threads of a given list onto the Thread_ReadyList. Note that the application may utilize its own lists. For example, it may provide a list for all threads that are waiting for a particular event. The current thread may also use Thread_SuspendOnList to place itself on the WaitList (within Thread_Struct) of another thread. For example, as explained earlier, when a thread completes, Thread_AfterLife calls Thread_SuspendOnList to schedule all threads found on the current thread's WaitList.

Examine the Thread_Suspend function in cthreadz.cpp

The Thread_Suspend function is called directly by the current thread or by Thread_SuspendOnList to transfer control to another thread. A long-running shared code thread can defer to other runnable threads by calling Thread_Schedule on itself before calling Thread_Suspend. This sequence places the current thread at the end of the Thread_ReadyList and passes control to the thread on the head of that list.

The Thread_Suspend function executes the NT SwitchToFiber function to return to the initial fiber at the point following the SwitchToFiber call in the Thread_Dispatch function. The initial fiber than tries to find another runnable shared code thread in the Thread_ReadyList or in the Thread_DeferredReadyList.

Most of the available NT fiber functions are used to manage shared code threads. The following describes how each is used in cthreadz.cpp.

1. The ConvertThreadToFiber function is used in Thread_ModuleInit to make the fiber facility available. Essentially, the main Win32 thread becomes the first fiber. The address of this fiber is saved so that a shared code thread can switch back to it when it suspends or completes. The Thread_Dispatch function and all functions in the calling program run in this initial fiber (unless called by a shared code thread).
 2. The CreateFiber function is used in the NewFiber function in cthreadz.cpp, which is called when the Thread_FreeList is empty or not in use to create a new shared code thread. This call is not made when an entry on the Thread_FreeList is available because the old fiber (saved in the Thread_Struct) can be reused for the new shared code thread.

3. The SwitchToFiber function is used in two places. In Thread_Dispatch, it is used to switch to the fiber associated with the shared code thread to be executed from the initial fiber. In Thread_Suspend, it is used to switch back to the initial fiber after the current shared code thread suspends or completes. Note that a completed shared code thread still "suspends" because it is actually placed on either the DeadThreadList or the FreeThreadList and will never again be executed (in the same context).

The invention has now been described with reference to the preferred embodiments. Alternatives and substitutions will now be apparent to persons of ordinary skill in the art. For example, although the preferred embodiment is described in connection with the Non-Stop Kernal operating system, the principles are applicable to porting any system utilizing self-scheduling threads to Windows NT Accordingly, it is not intended to limit the invention except as provided by the appended claims.

SOURCE CODE MODULES

```
#ifndef __NTHREAD_H__
#define __NTHREAD_H__
// include_path - changed rosgen.h to rosetta/rosgen.h in the following
#pragma pack(push, one, 4)
#include "rosetta/rosgen.h" /* rosetta utilities */
#pragma pack(pop, one)
//#include "guardian/hgthread"   // SWE
#define _WIN32_WINNT 0 × 0400
#pragma pack(push, one, 4)
#ifndef _WINDOWS_
#include <windows.h>
#endif
#pragma pack(pop, one)
#define _WIN32_WINNT 0 × 0400
#pragma pack(push, one, 4)
#include <winbase.h>
#pragma pack(pop, one)
//#undef Exception
//#include <afx.h>
//-
//#include "tmf_s09/ngeneral.h"
#include "tmf_s08/nllistz.h"    // SWE
#include "tmf_s09/nlocalz.h"    // SWE
#ifndef _AITG_TESTING
#define _AITG_TESTING 0
#endif
#if !_AITG_TESTING
#undef _export_globals
#undef _global
#undef _value
#define _global extern
#define _value(x)
#endif/*_AITG_TESTING*/
//BLOCK Thread ^Defs;
#define DLLEXPORT _declspec(dllexport)
//SWE - Start stuff From guardian\hgthread.bak
#define GTHREAD_BYTES(Tsize,Rsize)
        // swap area is not contiguous
#define GThread_CB(id) GThread_CB_Template *id
#define GThread_CB Fields Public
                                                 \
    GThread_CB(LinkNext);             /* Reserved for thread package*/   \
    GThread_CB(Linkprev);             /* (typically to link thread on lists)*/   \
    int_32      GTh_Marker;           /* Eye-catcher & version word*/
                                                 \
    GThread_CB(ThreadNext);           /* Links to next (younger) and*/   \
    GThread_CB(Threadprev);           /* previous (older) thread,*/
        \
                                      /* anchored in MainThread*/
        \
    unsigned_char *StackOrigin;       /* Stack origin for thread*/
        \
    int_32         StackSize;         /* Stack size allocated (bytes)*/   \
    unsigned.char *SwapArea;          /* Swap area starting address, or 0d*/   \
    unsigned_char *StackStart;        /* Lowest address and bytes used on*/   \
    int_32         Stackused;         /* primary stack*/
```

-continued

SOURCE CODE MODULES

```
    \
unsigned_char *PrivStart;           /* Lowest address and bytes
used on*/          \
int_32      PrivUsed;               /* Priv stack in unpriv
native process*/
#define GThread_CB_Fields_Private fixed_0 GThread_Private
[19];// length must match structure in JGTHREAD
struct GThread_CB_Template
   GThread_CB_Fields_Public
   GThread_CB Fields Private
};
//SWE - End stuff From guardian\hgthread.bak
// The implementations of the itertis in this BLOCK should be
considered
// PRIVATE.
//---------------------------------------------------------------------
-----------
//
//     Thread ^ Struct -- Public definition of a Thread.
//
//     Each thread is embodied by an occurrence of a
'Thread ^ Struct'.
//     A user of this module may use the LList module to
maintain
//     lists of threads that are not ready to run. However,
note
//     that:
//     a. Putting a 'Thread ^ Struct' onto a user-defined
list has
//     the effect of making that thread NOT READY to
run, and
//     b. Scheduling a thread has the effect of
automatically
//     removing the 'Thread ^ Struct' from whatever
user-defined
//     list that the 'Thread ^ Struct' might be on.
//
//     A user should NEVER allocate a 'Thread ^ Struct'
himself. These
//     are allocated implicitly by calling a procedure that
contains
//     a 'THREAD ^ NEW[PARAMETERLESS]' define.
//
//
//===============================
=========
DLLEXPORT class Thread_Struct
{
public:
   LListElement_Struct Links;       // Link words for
putting this structure
                                    // onto a list.
   _redefarray(Word,Data,0,-1,this[1]);  // Other stuff of a
variable length, which
                                    // is private to this
module.
};
typedef VOID (WINAPI *PTDM_START_ROUTINE) (
   int 1pParameter1,
     int 1pParameter2
   );
typedef PTDM_START_ROUTINE LPTDM_START_ROUTINE;
//---------------------------------------------------------------------
----------------
//
//     ThreadImp ^ Struct -- Definition of a Thread.
//
//     A 'Thread ^ Struat' is exactly the public portion of
this.
//
//===============================
=========
DLLEXPORT struct ThreadImp_Struct
{
union }
     GThread_CB_Template              GThreadCb;
       // Description of the thread, as far as the
```

-continued

SOURCE CODE MODULES

```
    // 'GThread' module is concerned.
    LListElement_Struct            Links;
    // List links. These links are available for
    // scheduling purposes. A user of this module
    // may use the 'LList' module to place a thread
    // on any list, so that he knows when to
    // schedule it.
};
int_16                             EyeCatcher;
    // Always equal to 'Thread ^EyeCatcher' ("TH").
union {
Addr                               ParentThreadAddr;
ThreadImp_Struct                   *ParentThread;
// Address of the thread that created us. If
// our creator is threadless, this value is
// 'Nil ^Addr'
};
union {
    Addr                           OwningHeapAddr;
    Word                           *OwningHeap;
    // The heap from which this 'ThreadImp ^Struct'
    // was allocated, if it is to be freed.
    // 'Nil ^Addr' if it came from the default
    // heap, and our ModuleInit was invoked with
    // 'NeverDispose' = 'True'.
};
unsigned_16                        ThreadIsComplete:1;
    // TRUE iff the thread has completed.
unsigned_16                        Reserved1:15;
    // Unused; always zero.
UnsignedInt                        WaiterCount;
    // The number of threads that are currently
    // waiting (inside 'Thread ^WaitForExit') for
    // this thread to terminate. We cannot free
    // up the thread descriptor until this value
    // becomes zero.
LListHeader_Struct                 WaitList;
    //List of threads that are waiting for this
    // thread to complete. Each of these threads
    // will be awakened when this thread exits
    // from its main procedure.
Addr                               ExceptionHandlerAddr;
    // Address of the thread's top exception handler
    void (*ContextSaveProc) (DblInt    ContextProcParam);    //
Procedure to save context for this thread.
                                                             //
('Nil ^ProcAddr' if none.)
    void (*ContextRestoreProc) (DblInt ContextProcParam);    //
procedure to restore context for this thread.
                                                             //
('Nil ^ProcAddr' if none.)
    DblInt    ContextProcParam;                              //
Parameter for 'ContextSaveProc' and
                                                             //
'ContextRestoreProc'. Defaults to 'Nil ^Addr'
    DblInt SwapAreaByteLenDbl;                               //
Current size of the thread's swap area,
                                                             // in
bytes.
    int_16 SwapAreaIndex;                                    //
Index of the SwapAreaList to/from which
                                                             // our
current SwapArea could be put/gotten.
    int_16    Reserved2;                                     //
Unused; always zero. Here for alignment.
    // Fields added for the Fibers port are below.
    LPTDM_START_ROUTINE    Proc;                             //
The procedure to execute.
    LPVOID Fiber;                                            //
The fiber that corresponds to this thread.
    DblInt Param1;                                           //
The first parameter to the fiber routine.
    DblInt Param2;                                           //
The second parameter to the fiber
routine
};
//------------------------------------------------------------------------
```

-continued

| SOURCE CODE MODULES |
|---|

```
//
//    ThreadG -- Global Data.
//
//    This data is placed into a single STRUCT to conserve direct
//    global storage.
//
//==================================
=========
DLLEXPORT struct _ThreadG
{
  union {
    Addr                              CurrentThreadAddr;
    ThreadImp_Struct                  *CurrentThread;
    // Currently executing thread, or 'Nil ^ Addr'
    // if none.
  };
  union {
    Addr                              DebugThreadAddr;
    ThreadImp_Struct                  *DebugThread;
    // Thread that we would like to get into
    // DEBUG, or 'Nil ^ Addr' if none.
  };
  LListHeader_Struct    Thread_ReadyList;
  // List of threads that are ready to run.
  LListHeader_Struct    Thread_DeferredReadyList;
  // List of threads that are ready to run,
  // but should be run AFTER the threads on
  // 'Thread ^ ReadyList'
  union {
    Addr                              UndertakerThreadAddr;
    Word                              *UndertakerThread;
    // The thread descriptor of the undertaker
    // thread.
  };
  LListHeader_Struct    FreeThreadList;
    // List of threads that are available for
    reuse.
  LListHeader_Struct    DeadThreadList;
    // List of dead threads that need to be
    // deallocated.
  LListHeader_Struct    FreeStackList;
    // List of 'ThreadStack ^ Struct's that are
    // available for reuse.
  Addr                                GlobalHandlerAddr;
    // While a thread is running, the address of
    // the top exception handler lives here.
  union {
    Addr                              HeapAddr;
    Word                              *Heap;
    // Heap to use.
  };
  Addr                                MinMainStackAddr;
  Addr                                MaxMainStackAddr;
    // The lower and upper bounds of addresses that
    // are within the execution area of a thread's
    // stack.
  Addr                                MinPrivStackAddr;
  Addr                                MaxPrivStackAddr;
    // The lower and upper bounds of addresses that
    // are withing the execution area of a thread's
    // privileged stack. If the process doesn't
    // have a separate priv stack, these are the
    // same as MinMainStackArea and MaxMainStackArea
    // A process doesn't have a separate stack if
    // either it is non-native mode, or its MAIN
    // procedure is PRIV.
  DblInt                              SwapAreaByteLenDbl;
    // Max context to save per thread.
  Boolean                             NeverDispose;
    // True iff we should not dispose threads
    // when we are done with them.
  Word                                Reserved1;
    // Unused, keeps things DblWord aligned.
  LListHeader_Struct    SwapAreaList [11];
    // Lists of free SwapArea's of various sizes.
```

-continued

SOURCE CODE MODULES

```
    // The list at index [0] contains swap areas
    // of size 'SwapAreaByteLenDbl'. Each succeeding
    // list contains areas of twice the size of
    // the previous list's elements.
GThread_CB_Template MainCb;
    // Main control block for the 'GThread'
    // module.
LPVOID               Initial_Fiber;
    // Address of the initial fiber.
};
//----------------------------------------------------------------------
---------
//
//      ScheduleOption Literals
//
//      These literals can be passed to 'Thread ^Schedule' and
//      'Thread ^ScheduleList'.
//
//==================================
=========
enum {Normal_ScheduleOption = False};
                                                            // Schedule thread at its
normal time.
enum {Defer_ScheduleOption = True};        // Schedule thread to run
after all normally
                                                            // scheduled threads.
//END BLOCK;
#ifndef _AITG_TESTING
#define _AITG_TESTING 0
#endif
#if !_AITG_TESTING
#undef _global
#undef _value
#define _export_globals
#define _global
#define _value(x) = x
#endif/* _AITG_TESTING*/
//"Thread ^Addr -- Return the Addr of the current
'Thread ^Struct'"
//----------------------------------------------------------------------
--------------
//
//      If we are currently IN thread mode, return the 'Addr'
of the
//      current thread's 'Thread ^Struct'.
//
//      If we are NOT currently in thread mode, return
'Nil ^Addr'.
//
//==================================
=========
DLLEXPORT _alias("THREAD ^ADDR") Addr Thread_Addr( );
/*Addr*//*RESULT*/ // (out) Addr of the current
'Thread ^Struct'.
//----------------------------------------------------------------------
------------
//
//      This procedure will determine whether a given 'Addr'
is within
//      the stack space of any thread. If it is, then that
address
//      CANNOT be used except while that thread is running.
//
//      'Nil ^Addr' is assumed to NOT be within any thread's
stack.
//
//      This procedure is typically used in the idiom:
//
//              AssertTruth (NOT ThreadAAddrIsInThread
(@ReferenceParam));
//
//==================================
=========
DLLEXPORT _alias("THREAD ^ADDRISINTHREAD") Boolean
Thread_AddrIsInThread
    (
    Addr ObjectAddr                      // (in) An address to check.
```

-continued

SOURCE CODE MODULES

```
/*Boolean*//*RESULT*/              // (out) 'False' => the address is NOT
                                   //        within any thread
stack.
                                   //       'True' => the address IS
                                   //        within some thread
stack.
      );
//------------------------------------------------------------------
----------
//
//      The 'Thread^Create -- Create a New Thread.
//
//      This procedure will create a new thread. The newly
created
//      thread will be ready to run. Control returns to the
caller
//      of 'Thread^Create' before the new thread has ever had
a chance
//      to run.
//
//      The new thread will execute by calling the
'ThreadProc' parameter,
//      passing 'Param1' through 'Param4'. If the new thread
ever returns
//      from its 'ThreadProc', the thread will be destroyed.
(This is the
//      only way to destroy a thread.)
//-------------------------------------------------------------------------
--------
//
//      The 'ThreadProc' should be declared as:
//
//      PROC ThreadProc (Param1, Param2);
//
//      DblInt Param1, Param2;
//      BEGIN . . . END;
//
//      If you like, you may declare either or both of the
params as
//      'Addr's instead of 'DblInt's.
//
//      The ThreadProc must always take exactly 2 32-bit
parameters,
//      whether it uses them or not.
//
//=================================
=========
DLLEXPORT _alias("THREAD^CREATE") _variable Addr Thread_Create
   (int_32 amask,
     procaddr   Threadproc,           // (in)    Top-level procedure for the
                                      //         newly created thread.
DblInt    Param1,                     // (in,opt) 'Pararm2' value to pass
to
                                      //    the newly created thread.
If
//     omitted, we pass an
undefined value.
DblInt    Param2,                     // (in,opt) 'Param2' value to pass
to
                                      //    the newly created thread.
If
                                      //    omitted, we pass an
undefined value.
Word         *Heap                    // (in,opt) Heap from which to
allocate the
                                      //    'Thread^Struct'.
/*Addr*//*RESULT*/ // (out) Address of the newly created
thread.
);
//-------------------------------------------------------------------------
------------
//
//      Thread^DegubThread -- Special Thread for Debugging
//
//      This procedure creates a thread that does nothing but
//      wake up once per second. This allows one to get a
server
```

-continued

SOURCE CODE MODULES

```
//      process into DEBUG without having to take extra steps
to
//      get the process to wake up.
//
//      In order to use this thread, you must also use the
ThreadIo
//      module, and all of the machinery that that implies.
//
//      To get the benefits of this thread, just call this
procedure
//      after initializing the Thread and ThreadIo modules.
//
//=========================================
DLLEXPORT _alias ("THREAD ^DEBUGTHREAD") void
Thread_DebugThread ( );
DLLEXPORT _alias ("THREAD ^DEBUGTHREADPROC") void
Thread_DebugThreadProc(
   DblInt    Param1,
   DblInt    Param2
   );
DLLEXPORT _alias ("THREAD ^DISPOSESWAPAREA") void
Thread_DisposeSwapArea (
   ThreadImp_Struct *Thread);
DLLEXPORT void Thread_SwapInAndRun (ThreadImp_Struct *Thread);
DLLEXPORT _alias("THREAD ^UNDERTAKER") void Thread_Undertaker (
      DblInt Param1, // (in) Unused.
      DblInt Param2 // (in) Unused.
      );
DLLEXPORT _alias("THREAD ^NEWSWAPAREA") void Thread_NewSwapArea
   (
   ThreadImp_Struct *Thread,
                     // (i/o) Thread for whiah to allocate the
area.
   DblInt            MinByteLenDbl
                     // (in) Minimum size of the swap area,
                     //      in bytes.
   );
//----------------------------------------------------------
--------------
//
//      Give control to all threads that are ready to
execute.
//      You MUST NOT be in thread mode when you call this
routine
//
//      You get control back from this procedure when there
are no
//      longer any threads that are ready to run.
//
//=========================================
DLLEXPORT _alias("THREAD ^DISPATCH") void Thread_Dispatch( );
//----------------------------------------------------------
--------------
//
//      This procedure retrieves the values previously
specified
//      by 'Thread ^SetContextProc' for the current thread.
These are
//      the procedures that will be automatically called
whenever the
//      current thread is about to be suspended or
dispatched.
//
//      Note that due to the wonders of TAL, these procedure
variables
//      are returned as 'Word's. The word contains the code
space plus
//      PEP table index for the procedure. A value of zero
means none.
//
//      See "Usage Considerations" note 18 for more
information about
//      context procs. Most programs (even many that call
//      'Thread ^SetContextProcs') will never have a need to
call
```

SOURCE CODE MODULES

```
//      this procedure.
//
//=================================
=========
DLLEXPORT _alias("THREAD ^GETCONTEXTPROCS") _variable void
Thread_GetContextProcs
   ( int_32 amask,
     procaddr *ContextSaveProc,      // (out,opt)    Procedure
descriptor of the
                                     //       procedure called to
SAVE the context
                                     //       for the current
thread. 'Nil ^ProcAddr'
                                     //       is returned if no such
procedure exists
     procaddr *ContextRestoreProc,
                                     // (out,opt)    Procedure
descriptor of the
                                     //       procedure called to
RESTORE the context
                                     //       for the current
thread. 'Nil ^ProaAddr'
                                     //       is returned if no such
proaedure
                                     //       exists.
     DblInt    *ContextProcParam     // (out,opt)    Value being
passed to the
                                     //       ContextSaveProc and
ContextRestoreProc
                                     //       whenever they are
called.
        );
//------------------------------------------------------------------------
---------
//
//      This procedure returns 'True' if we are IN thread
mode, and
//      returns 'False' otherwise.
//
//=================================
=========
DLLEXPORT _alias("THREAD ^ISACTIVE") Boolean Thread_IsActive( );
//------------------------------------------------------------------------
---------
//
//      Initialize this module.
//
//=================================
=========
DLLEXPORT _alias ("THREAD ^MODULEINIT") _variable void
Thread_ModuleInit
   (int_32 amask,
     Word *HeapToUse,                // (in)     Heap to use for thread descriptor
                                     //    allocation.
     int_16 ThreadStackSize,
                                     // (in) A 'WordLen'. The number of
words of
                                     //    stack data that will be saved for a
                                     //    thread in one location. Threads
that
                                     //    have more than this number of words
of
                                     //    stack in use at the time of any call
                                     //    to 'Thread ^Suspend' will achieve
                                     //     performance somewhat worse than
other
                                     //    threads. Since RISC stacks are
about
                                     //    3 times as big as T16 stacks, we
will
                                     //    internally multiply this value by 3
if
                                     //    we are executing in native mode.
     int_16 MaxStackGrowth,
                                     // (in)    A 'WordLen'. Maximum number of
words
                                     //    that the stack can grow between this
```

-continued

SOURCE CODE MODULES

```
                              //    call to 'Thread ^ModuleInit' and
                              //    ANY call to 'Thread ^Dispatcher'.
Since
                              //    RISC stacks are about 3 times as big
as
                              //    T16 stacks, we will internally
multiply
                              //    this value by 3 if we are executing
in
                              //    native mode.
    Boolean NeverDispose
                              // (in,opt) If present and 'True', this
                              //    module will never dispose of any
                              //    memory that it allocates. In stead,
                              //    it will save all memory for reuse
                              //    by itself only.
                              //    Defaults to FALSE.
);
//--------------------------------------------------------------------------------
//
//    This procedure returns the address of the thread that
//    created a given thread. If the subject thread way
created
//    by mainline code, we return 'Nil ^Addr'.
//
//    Note that we give no guarantee whatsoever that the
parent thread
//    still exists. The caller probably needs to assure
this via
//    some independent mechanism.
//
//================================================
DLLEXPORT _alias("THREAD ^PARENT") _variable Addr Thread_Parent
    (int_32 amask,
    Thread_Struct *Thread         // (in,opt) Thread whose parent is
desired.
                                  //    Defaults to the current
thread.
/*Addr*//*RESULT*/ // (out) Address of the descriptor of the
                                    thread's parent. 'Nil ^Addr' if
none.
    );
//--------------------------------------------------------------------------
//
//    Add 'Thread' to the list of threads ready to be run.
//
//================================================
DLLEXPORT _alias("THREAD ^SCHEDULE") variable void
Thread_Schedule
    (int_32 amask,
    Thread_Struct *Thread,        // (in) Thread to schedule.
    Boolean        Defer          // (in,opt)    One of:
                                  //      'Normal ^ScheduleOption'
(False) =>
                                  //    Run thread as soon
as
                                  //    convenient.
                                  //    'Defer ^ScheduleOption'
(True) =>
                                  //    Run thread AFTER all
other
                                  //    ready threads have
run.
    );
//------------------------------------------------------------------------
//
//    Put every thread onto the ready list.
//
//================================================
DLLEXPORT _alias ("THREAD ^SCHEDULEALL") void
Thread_ScheduleAll( );
```

-continued

SOURCE CODE MODULES

```
//------------------------------------------------------------------------
//
//      Schedule an entire list of threads for execution.
//      The list may be empty.
//
//==========================================

DLLEXPORT _alias("THREAD ˆSCHEDULELIST") variable void
Thread_ScheduleList
    ( int_32 amask,
    LListHeader_Struct *List,        // (in) List of threads to
schedule.
Boolean            Defer             // (in,opt) One of:
                                     //      'Normal ˆScheduleOption'
(False) =>
                                     //      Run thread as
soon as
                                     //      convenient.
                                     //      'Defer ˆScheduleOption'
(True) =>
                                     //      Run thread
AFTER all other
                                     //      ready threads
have run.
);
//------------------------------------------------------------------------
//
//      This procedure lets you specify procedures that will
be
//      automatically called whenever the current thread is
about to
//      be dispatched or suspended. These procedures can
save and
//      restore global context for the thread. For example,
these
//      procedures could change the current user id, the
current
//      transaction, and/or the current trap handler.
//
//      The context routines are specified individually for
each thread;
//      When a thread first comes to life, it has no context
routines.
//      You may call 'Thread ˆSetContextProcs' more than once.
A subsequent
//      call completely replaces information from an earlier
call.
//
//      Each context procedure must be defined to take a
single DblInt
//      parameter, by value. You may speaify this value in
the call
//      to 'Thread ˆSetContextProcs'.
//
//      See "Usage Considerations" note 18 for more
information about
//      the context procs. Most programs will not have a
need to
//      call this procedure.
//
//==========================================

DLLEXPORT _alias("THREAD ˆSETCONTEXTPROCS") variable void
Thread_SetContextProcs
    ( int_32 amask,
    proaaddr ContextSaveProc,        // (in,opt) Name of the
procedure to call
                                     //      to SAVE the context
for the current
                                     //      thread. This
procedure will be called
                                     //      whenever the current
thread is about
                                     //      to be suspended. If
omitted, then
```

SOURCE CODE MODULES

```
                                    //      no procedure will be
called.
    proaaddr ContextRestoreProc,    // (in,opt)  Name of the
procedure to call
                                    //      to RESTORE the
context for the current
                                    //      thread. This
procedure will be called
                                    //      whenever the current
thread is about
                                    //      to be dispatched.
If omitted, then
                                    //      no procedure will be
called.
    DblInt    ContextProcParam      // (in,opt)  Value to pass to
the ContextSavePro
                                    //      ContextRestoreProc
whenever they are
                                    //      called. If omitted,
if defaults to
                                    //      'Nil ^Addr'.
  );
//-------------------------------------------------------------------
//
//      Suspend execution of the current thread. You MUST be in
//      thread mode when you call this routine. You will receive
//      control back eventually, after somebody places the thread
//      back onto the ready list.
//
//====================================================================
DLLEXPORT _alias("THREAD ^SUSPEND") void Thread_Suspend ( );
//-------------------------------------------------------------------
//
//      Suspend execution of the current thread, and place the current
//      'Thread ^Struct' onto a specified LList. You MUST be in
//      thread mode when you call this routine. You will receive
//      control back eventually, after somebody places the thread
//      back onto the ready list. [Presumably, he will find that
//      thread by searching the list that you specify here.]
//
//====================================================================
DLLEXPORT _alias("THREAD ^SUSPENDONLIST") void Thread_SuspendOnList
  (
    LListHeader_Struct *ListHeader    // (i/o) The list onto which to place the
                                      //       current thread.
  );
//-------------------------------------------------------------------
//
//      Suspend the current thread until a specified thread has exited
//      its main procedure.
//
//      If, for any reason, it is possible for the current thread to
//      lose interest in waiting, you may (via some other thread) set
//      a global variable of your choosing, and then schedule the
//      current thread. This will cause us to return early.
//
//      You must, via external mechanisms, ensure that the thread upon
```

-continued

SOURCE CODE MODULES

```
//      which you wish to wait still exists before you call
this routine.
//      The easiest way to do this is to have some kind of a
global
//      pointer to the target thread, and have the target
thread null
//      out this pointer before it exits. If you find that
pointer to
//      be null, don't call this routine.
//
//=================================
=========
DLLEXPORT _alias("THREAD^WAITFOREXIT") _variable Boolean
Thread_WaitForExit
   ( int_32 amask,
Thread_Struct *Thread,
                                    // (in) Thread on which to wait.
Boolean        *Quit              // (in,opt) If provided, we will quit
waiting
                                    //    when this value becomes
'True' and
                                    //    the current thread is
scheduled.
/*Boolean*//*RESULT*/            // (out) True => the specified thread
                                    //         has terminated.
                                    //       False => wait was terminated
                                    //         by your 'Quit'
variable.
);
//------------------------------------------------------------------------
--------
// Thread_Start
//
//
//=================================
=========
void Thread_Start(ThreadImp_Struct *pThreadStruct);
#endif // _NTHREAD_H_
LISTING FOR NTHREADZ.H
#ifndef _NTHREAD_H_
#define _NTHREAD_H_
// include_path - changed rosgen.h to rosetta/rosgen.h in the
following
#pragma pack(push, one, 4)
#include "rosetta/rosgen.h" /* rosetta utilities */
#pragma pack(pop, one)
//#include "guardian/hgthread"    // SWE
#define _WIN32_WINNT 0 x 0400
#pragma pack(push, one, 4)
#ifndef _WINDOWS_
#include <windows.h>
#endif
#pragma pack(pop, one)
#define _WIN32_WINNT 0 x 0400
#pragma pack(push, one, 4)
#include <winbase.h>
#pragma pack(pop, one)
//#undef Exception
//#include <afx.h>
//-
//#include "tmf_s09/ngeneral.h"
#include "tmf_s08/nllistz.h"     // SWE
#include "tmf_s09/nlocalz.h"     // SWE
#ifndef _AITG_TESTING
#define _AITG_TESTING 0
#endif
#if !_AITG_TESTING
#undef _export_globals
#undef _global
#undef _value
#define _global extern
#define _value(x)
#endif/*_AITG_TESTING*/
//BLOCK Thread^Defs;
#define DLLEXPORT _declspec(dllexport)
//SWE - Start stuff From guardian\hgthread.bak
#define GTHREAD_BYTES(Tsize,Rsize)
```

SOURCE CODE MODULES

```
    // swap area is not contiguous
#define GThread_CB(id) GThread_CB_Template *id
#define GThread_CB Fields Public
                                          \
  GThread_CB(LinkNext);             /* Reserved for thread
package*/         \
  GThread_CB(Linkprev);             /* (typically to link thread
on lists)*/        \
int_32     GTh_Marker;              /* Eye-catcher & version word*/
                                          \
GThread_CB(ThreadNext);             /* Links to next (younger)
and*/         \
GThread_CB(Threadprev);             /* previous (older) thread,*/
       \
                                    /* anchored in MainThread*/
       \
unsigned_char *StackOrigin;         /* Stack origin for thread*/
       \
int_32        StackSize;            /* Stack size allocated
(bytes)*/     \
unsigned.char *SwapArea;            /* Swap area starting address,
or 0d*/       \
unsigned_char *StackStart;          /* Lowest address and bytes
used on*/     \
int_32        Stackused;            /* primary stack*/
       \
unsigned_char *PrivStart;           /* Lowest address and bytes
used on*/     \
int_32     PrivUsed;                /* Priv stack in unpriv
native process*/
#define GThread_CB_Fields_Private fixed_0 GThread_Private
[19];// length must match structure in JGTHREAD
struct GThread_CB_Template
   GThread_CB_Fields_Public
   GThread_CB Fields Private
};
//SWE - End stuff From guardian\hgthread.bak
// The implementations of the itertis in this BLOCK should be
considered
// PRIVATE.
//-------------------------------------------------------------------------
-----------
//
//     Thread ^Struct -- Public definition of a Thread.
//
//     Each thread is embodied by an occurrence of a
'Thread ^Struct'.
//     A user of this module may use the LList module to
maintain
//     lists of threads that are not ready to run. However,
note
//     that:
//     a. Putting a 'Thread ^Struct' onto a user-defined
list has
//     the effect of making that thread NOT READY to
run, and
//     b. Scheduling a thread has the effect of
automatically
//     removing the 'Thread ^Struct' from whatever
user-defined
//     list that the 'Thread ^Struct' might be on.
//
//     A user should NEVER allocate a 'Thread ^Struct'
himself. These
//     are allocated implicitly by calling a procedure that
contains
//     a 'THREAD ^NEW[PARAMETERLESS]' define.
//
//
//=========================================
=========
DLLEXPORT class Thread_Struct
{
public:
   LListElement_Struct Links;        // Link words for
putting this structure
                                     // onto a list.
```

-continued

| SOURCE CODE MODULES |
|---|

```
__redefarray(Word,Data,0,-1,this[1]);      // Other stuff of a
variable length, which
                                           // is private to this
module.
};
typedef VOID (WINAPI *PTDM_START_ROUTINE) (
   int 1pParameter1,
      int 1pParameter2
   );
typedef PTDM_START_ROUTINE LPTDM_START_ROUTINE;
//-------------------------------------------------------------------------
----------------
//
//     ThreadImp ^Struct -- Definition of a Thread.
//
//     A 'Thread ^Struat' is exactly the public portion of
this.
//
//================================
=========
DLLEXPORT struct ThreadImp_Struct
{
union }
     GThread_CB_Template           GThreadCb;
     // Description of the thread, as far as the
     // 'GThread' module is concerned.
     LListElement_Struct           Links;
     // List links. These links are available for
     // scheduling purposes. A user of this module
     // may use the 'LList' module to place a thread
     // on any list, so that he knows when to
     // schedule it.
};
int_16                             EyeCatcher;
     // Always equal to 'Thread ^EyeCatcher' ("TH").
union {
Addr                               ParentThreadAddr;
ThreadImp_Struct                   *ParentThread;
// Address of the thread that created us. If
// our creator is threadless, this value is
// 'Nil ^Addr'
};
union {
     Addr                          OwningHeapAddr;
     Word                          *OwningHeap;
     // The heap from which this 'ThreadImp ^Struct'
     // was allocated, if it is to be freed.
     // 'Nil ^Addr' if it came from the default
     // heap, and our ModuleInit was invoked with
     // 'NeverDispose' = 'True'.
};
unsigned_16                        ThreadIsComplete:1;
     // TRUE iff the thread has completed.
unsigned_16                        Reserved1:15;
     // Unused; always zero.
UnsignedInt                        WaiterCount;
        // The number of threads that are currently
        // waiting (inside 'Thread ^WaitForExit') for
        // this thread to terminate. We cannot free
        // up the thread descriptor until this value
        // becomes zero.
LListHeader_Struct                 WaitList;
        //List of threads that are waiting for this
        // thread to complete. Each of these threads
        // will be awakened when this thread exits
        // from its main procedure.
Addr                               ExceptionHandlerAddr;
        // Address of the thread's top exception handler
     void (*ContextSaveProc) (DblInt   ContextProcParam);    //
Procedure to save context for this thread.
                                                             //
('Nil ^ProcAddr' if none.)
     void (*ContextRestoreProc) (DblInt ContextProcParam);   //
procedure to restore context for this thread.
                                                             //
('Nil ^ProcAddr' if none.)
   DblInt    ContextProcParam;                               //
```

SOURCE CODE MODULES

-continued

```
Parameter for 'ContextSaveProc' and                      //
'ContextRestoreProc'. Defaults to 'Nil ^Addr'
    DblInt      SwapAreaByteLenDbl;                      //
Current size of the thread's swap area,
                                                         // in
bytes.
    int_16      SwapAreaIndex;                           //
Index of the SwapAreaList to/from which
                                                         // our
current SwapArea could be put/gotten.
    int_16      Reserved2;                               //
Unused; always zero. Here for alignment.
    // Fields added for the Fibers port are below.
    LPTDM_START_ROUTINE     Proc;                        //
The procedure to execute.
    LPVOID      Fiber;                                   //
The fiber that corresponds to this thread.
    DblInt      Param1;                                  //
The first parameter to the fiber routine.
    DblInt      Param2;                                  //
The second parameter to the fiber
routine
};
//-------------------------------------------------------------------
----------
//
//      ThreadG -- Global Data.
//
//      This data is placed into a single STRUCT to conserve
direct
//      global storage.
//
//==================================================================
=========
DLLEXPORT struct _ThreadG
{
    union {
        Addr                            CurrentThreadAddr;
        ThreadImp_Struct                *CurrentThread;
        // Currently executing thread, or 'Nil ^Addr'
        // if none.
    };
    union {
        Addr                            DebugThreadAddr;
        ThreadImp_Struct                *DebugThread;
        // Thread that we would like to get into
        // DEBUG, or 'Nil ^Addr' if none.
    };
    LListHeader_Struct      Thread_ReadyList;
    // List of threads that are ready to run.
    LListHeader_Struct      Thread_DeferredReadyList;
    // List of threads that are ready to run,
    // but should be run AFTER the threads on
    // 'Thread ^ReadyList'
    union {
        Addr                            UndertakerThreadAddr;
        Word                            *UndertakerThread;
        // The thread descriptor of the undertaker
        // thread.
    };
    LListHeader_Struct      FreeThreadList;
        // List of threads that are available for
        reuse.
    LListHeader_Struct      DeadThreadList;
        // List of dead threads that need to be
        // deallocated.
    LListHeader_Struct      FreeStackList;
        // List of 'ThreadStack ^Struct's that are
        // available for reuse.
    Addr                                GlobalHandlerAddr;
        // While a thread is running, the address of
        // the top exception handler lives here.
    union {
        Addr                            HeapAddr;
        Word                            *Heap;
        // Heap to use.
```

-continued

SOURCE CODE MODULES

```
};
Addr                                MinMainStackAddr;
Addr                                MaxMainStackAddr;
    // The lower and upper bounds of addresses that
    // are within the execution area of a thread's
    // stack.
Addr                                MinPrivStackAddr;
Addr                                MaxPrivStackAddr;
    // The lower and upper bounds of addresses that
    // are withing the execution area of a thread's
    // privileged stack. If the process doesn't
    // have a separate priv stack, these are the
    // same as MinMainStackArea and MaxMainStackArea
    // A process doesn't have a separate stack if
    // either it is non-native mode, or its MAIN
    // procedure is PRIV.
DblInt                              SwapAreaByteLenDbl;
    // Max context to save per thread.
Boolean                             NeverDispose;
    // True iff we should not dispose threads
    // when we are done with them.
Word                                Reserved1;
    // Unused, keeps things DblWord aligned.
LListHeader_Struct   SwapAreaList [11];
    // Lists of free SwapArea's of various sizes.
    // The list at index [0] contains swap areas
    // of size 'SwapAreaByteLenDbl'. Each succeeding
    // list contains areas of twice the size of
    // the previous list's elements.
GThread_CB_Template MainCb;
    // Main control block for the 'GThread'
    // module.
LPVOID              Initial_Fiber;
    // Address of the initial fiber.
};
//-------------------------------------------------------------------------
---------
//
//     ScheduleOption Literals
//
//     These literals can be passed to 'Thread ^ Schedule' and
//     'Thread ^ ScheduleList'.
//
//================================
=========
enum {Normal_ScheduleOption = False};
                                                // Schedule thread at its
normal time.
enum {Defer_ScheduleOption = True};            // Schedule thread to run
after all normally
                                                // scheduled threads.
//END BLOCK;
#ifndef _AITG_TESTING
#define _AITG_TESTING 0
#endif
#if !_AITG_TESTING
#undef _global
#undef _value
#define _export_globals
#define _global
#define _value(x) = x
#endif/* _AITG_TESTING*/
//"Thread ^ Addr -- Return the Addr of the current
'Thread ^ Struct'"
//-------------------------------------------------------------------------
--------------
//
//     If we are currently IN thread mode, return the 'Addr'
of the
//     current thread's 'Thread ^ Struct'.
//
//     If we are NOT currently in thread mode, return
'Nil ^ Addr'.
//
//================================
=========
DLLEXPORT _alias("THREAD ^ ADDR") Addr Thread_Addr( );
```

-continued

SOURCE CODE MODULES

```
/*Addr*//*RESULT*/ // (out) Addr of the current
'Thread ^ Struct'.
//------------------------------------------------------------------------
------------
//
//      This procedure will determine whether a given 'Addr'
is within
//      the stack space of any thread. If it is, then that
address
//      CANNOT be used except while that thread is running.
//
//      'Nil ^ Addr' is assumed to NOT be within any thread's
stack.
//
//      This procedure is typically used in the idiom:
//
//               AssertTruth (NOT ThreadAAddrIsInThread
(@ReferenceParam));
//
//==============================
=========
DLLEXPORT _alias("THREAD ^ ADDRISINTHREAD") Boolean
Thread_AddrIsInThread
    (
    Addr ObjectAddr                    // (in) An address to check.
/*Boolean*//*RESULT*/                  // (out) 'False' => the address is NOT
                                       //        within any thread
stack.
                                       //       'True' => the address IS
                                       //        within some thread
stack.
        );
//------------------------------------------------------------------------
----------
//
//       The 'Thread ^ Create -- Create a New Thread.
//
//       This procedure will create a new thread. The newly
created
//       thread will be ready to run. Control returns to the
caller
//       of 'Thread ^ Create' before the new thread has ever had
a chance
//       to run.
//
//       The new thread will execute by calling the
'ThreadProc' parameter,
//       passing 'Param1' through 'Param4'. If the new thread
ever returns
//       from its 'ThreadProc', the thread will be destroyed.
(This is the
//       only way to destroy a thread.)
//------------------------------------------------------------------------
-------
//
//       The 'ThreadProc' should be declared as:
//
//       PROC ThreadProc (Param1, Param2);
//
//       DblInt Param1, Param2;
//       BEGIN . . . END;
//
//       If you like, you may declare either or both of the
params as
//       'Addr's instead of 'DblInt's.
//
//       The ThreadProc must always take exactly 2 32-bit
parameters,
//       whether it uses them or not.
//
//================================
=========
DLLEXPORT _alias("THREAD ^ CREATE") _variable Addr Thread_Create
    (int_32 amask,
    procaddr    Threadproc,            // (in)  Top-level procedure for the
                                       //       newly created thread.
    DblInt    Param1,                  // (in,opt) 'Pararm2' value to pass
```

-continued

SOURCE CODE MODULES

```
to
                                    //   the newly created thread.
If
//    omitted, we pass an
undefined value.
DblInt   Param2,                    // (in,opt) 'Param2' value to pass
to
                                    //   the newly created thread.
If
                                    //   omitted, we pass an
undefined value.
Word        *Heap                   // (in,opt) Heap from which to
allocate the
                                    //    'Thread ^ Struct'.
/*Addr*//*RESULT*/ // (out) Address of the newly created
thread.
);
//------------------------------------------------------------------------
------------
//
//    Thread ^ DegubThread -- Special Thread for Debugging
//
//    This procedure creates a thread that does nothing but
//    wake up once per second. This allows one to get a
server
//    process into DEBUG without having to take extra steps
to
//    get the process to wake up.
//
//    In order to use this thread, you must also use the
ThreadIo
//    module, and all of the machinery that that implies.
//
//    To get the benefits of this thread, just call this
procedure
//    after initializing the Thread and ThreadIo modules.
//
//================================================================
=========
DLLEXPORT _alias ("THREAD ^ DEBUGTHREAD") void
Thread_DebugThread ( );
DLLEXPORT _alias ("THREAD ^ DEBUGTHREADPROC") void
Thread_DebugThreadProc(
   DblInt    Param1,
   DblInt    Param2
   );
DLLEXPORT _alias ("THREAD ^ DISPOSESWAPAREA") void
Thread_DisposeSwapArea (
   ThreadImp_Struct *Thread);
DLLEXPORT void Thread_SwapInAndRun (ThreadImp_Struct *Thread);
DLLEXPORT _alias("THREAD ^ UNDERTAKER") void Thread_Undertaker (
      DblInt Param1, // (in) Unused.
      DblInt Param2 // (in) Unused.
      );
DLLEXPORT _alias("THREAD ^ NEWSWAPAREA") void Thread_NewSwapArea
   (
   ThreadImp_Struct *Thread,
                       // (i/o) Thread for whiah to allocate the
area.
   DblInt             MinByteLenDbl
                       // (in) Minimum size of the swap area,
                       //        in bytes.
   );
//------------------------------------------------------------------------
--------------
//
//    Give control to all threads that are ready to
execute.
//    You MUST NOT be in thread mode when you call this
routine
//
//    You get control back from this procedure when there
are no
//    longer any threads that are ready to run.
//
//================================================================
=========
```

-continued

SOURCE CODE MODULES

```
DLLEXPORT _alias("THREAD ^DISPATCH") void Thread_Dispatch( );
//------------------------------------------------------------------------
//
//      This procedure retrieves the values previously specified
//      by 'Thread ^SetContextProc' for the current thread. These are
//      the procedures that will be automatically called whenever the
//      current thread is about to be suspended or dispatched.
//
//      Note that due to the wonders of TAL, these procedure variables
//      are returned as 'Word's. The word contains the code space plus
//      PEP table index for the procedure. A value of zero means none.
//
//      See "Usage Considerations" note 18 for more information about
//      context procs. Most programs (even many that call
//      'Thread ^SetContextProcs') will never have a need to call
//      this procedure.
//
//=========================================
DLLEXPORT _alias("THREAD ^GETCONTEXTPROCS") _variable void
Thread_GetContextProcs
   ( int_32 amask,
     procaddr *ContextSaveProc,      // (out,opt)   Procedure descriptor of the
                                     //             procedure called to SAVE the context
                                     //             for the current thread. 'Nil ^ProcAddr'
                                     //             is returned if no such procedure exists
     procaddr *ContextRestoreProc,
                                     // (out,opt)   Procedure descriptor of the
                                     //             procedure called to RESTORE the context
                                     //             for the current thread. 'Nil ^ProaAddr'
                                     //             is returned if no such proaedure
                                     //             exists.
     DblInt   *ContextProcParam      // (out,opt)   Value being passed to the
                                     //             ContextSaveProc and ContextRestoreProc
                                     //             whenever they are called.
   );
//------------------------------------------------------------------------
//
//      This procedure returns 'True' if we are IN thread mode, and
//      returns 'False' otherwise.
//
//=========================================
DLLEXPORT _alias("THREAD ^ISACTIVE") Boolean Thread_IsActive( );
//------------------------------------------------------------------------
//
//      Initialize this module.
//
//=========================================
DLLEXPORT _alias ("THREAD ^MODULEINIT") _variable void
Thread_ModuleInit
   (int_32 amask,
```

-continued

SOURCE CODE MODULES

```
    Word *HeapToUse,         // (in)    Heap to use for thread descriptor
                             //         allocation.
    int_16 ThreadStackSize,
                             // (in) A 'WordLen'. The number of words of
                             //     stack data that will be saved for a
                             //     thread in one location. Threads that
                             //     have more than this number of words of
                             //     stack in use at the time of any call
                             //     to 'Thread ^Suspend' will achieve
                             //      performance somewhat worse than other
                             //     threads. Since RISC stacks are about
                             //     3 times as big as T16 stacks, we will
                             //     internally multiply this value by 3 if
                             //     we are executing in native mode.
    int_16 MaxStackGrowth,
                             // (in)   A 'WordLen'. Maximum number of words
                             //     that the stack can grow between this
                             //     call to 'Thread ^ModuleInit' and
                             //     ANY call to 'Thread ^Dispatcher'. Since
                             //     RISC stacks are about 3 times as big as
                             //     T16 stacks, we will internally multiply
                             //     this value by 3 if we are executing in
                             //     native mode.
    Boolean NeverDispose
                             // (in,opt) If present and 'True', this
                             //     module will never dispose of any
                             //     memory that it allocates. In stead,
                             //     it will save all memory for reuse
                             //     by itself only.
                             //     Defaults to FALSE.
);
//----------------------------------------------------------------------
//
//     This procedure returns the address of the thread that
//     created a given thread. If the subject thread way created
//     by mainline code, we return 'Nil ^Addr'.
//
//     Note that we give no guarantee whatsoever that the parent thread
//     still exists. The caller probably needs to assure this via
//     some independent mechanism.
//
//=========================================
DLLEXPORT _alias("THREAD ^PARENT") _variable Addr Thread_Parent
    (int_32 amask,
    Thread_Struct *Thread           // (in,opt) Thread whose parent is desired.
                                    //    Defaults to the current thread.
    /*Addr*///*RESULT*/ // (out) Address of the descriptor of the
                                   thread's parent. 'Nil ^Addr' if none.
    );
//----------------------------------------------------------------------
//
//    Add 'Thread' to the list of threads ready to be run.
//
//=========================================
DLLEXPORT _alias("THREAD ^SCHEDULE") variable void
```

-continued

SOURCE CODE MODULES

```
Thread_Schedule
   (int_32 amask,
    Thread_Struct *Thread,        // (in) Thread to schedule.
    Boolean        Defer          // (in,opt)    One of:
                                  //     'Normal ^ScheduleOption'
(False) =>
                                  //    Run thread as soon
as
                                  //    convenient.
                                  //    'Defer ^ScheduleOption'
(True) =>
                                  //    Run thread AFTER all
other
                                  //     ready threads have
run.
   );
//------------------------------------------------------------------------
//
//     Put every thread onto the ready list.
//
//=========================================
DLLEXPORT _alias ("THREAD ^SCHEDULEALL") void
Thread_ScheduleAll( );
//------------------------------------------------------------------------
//
//     Schedule an entire list of threads for execution.
//     The list may be empty.
//
//=========================================
DLLEXPORT _alias("THREAD ^SCHEDULELIST") variable void
Thread_ScheduleList
   ( int_32 amask,
    LListHeader_Struct *List,     // (in) List of threads to
schedule.
    Boolean        Defer          // (in,opt) One of:
                                  //    'Normal ^ScheduleOption'
(False) =>
                                  //    Run thread as
soon as
                                  //    convenient.
                                  //    'Defer ^ScheduleOption'
(True) =>
                                  //    Run thread
AFTER all other
                                  //     ready threads
have run.
   );
//------------------------------------------------------------------------
//
//     This procedure lets you specify procedures that will
be
//     automatically called whenever the current thread is
about to
//     be dispatched or suspended. These procedures can
save and
//     restore global context for the thread. For example,
these
//     procedures could change the current user id, the
current
//     transaction, and/or the current trap handler.
//
//     The context routines are specified individually for
each thread;
//     When a thread first comes to life, it has no context
routines.
//     You may call 'Thread ^SetContextProcs' more than once.
A subsequent
//     call completely replaces information from an earlier
call.
//
//     Each context procedure must be defined to take a
single DblInt
```

-continued

| SOURCE CODE MODULES |
|---|

```
//      parameter, by value. You may speaify this value in
the call
//      to 'Thread ^SetContextProcs'.
//
//      See "Usage Considerations" note 18 for more
information about
//      the context procs. Most programs will not have a
need to
//      call this procedure.
//
//=================================
=========
DLLEXPORT _alias("THREAD ^SETCONTEXTPROCS") variable void
Thread_SetContextProcs
    ( int_32 amask,
      proaaddr ContextSaveProc,         // (in,opt) Name of the
procedure to call
                                         //      to SAVE the context
for the current
                                         //      thread. This
procedure will be called
                                         //      whenever the current
thread is about
                                         //      to be suspended. If
omitted, then
                                         //      no procedure will be
called.
      proaaddr ContextRestoreProc,      // (in,opt)  Name of the
procedure to call
                                         //      to RESTORE the
context for the current
                                         //      thread. This
procedure will be called
                                         //      whenever the current
thread is about
                                         //      to be dispatched.
If omitted, then
                                         //      no procedure will be
called.
      DblInt    ContextProcParam         // (in,opt)  Value to pass to
the ContextSavePro
                                         //      ContextRestoreProc
whenever they are
                                         //      called. If omitted,
if defaults to
                                         //      'Nil ^Addr'.
    );
//--------------------------------------------------------------------
----------
//
//      Suspend execution of the current thread. You MUST be
in
//      thread mode when you call this routine. You will
receive
//      control back eventually, after somebody places the
thread
//      back onto the ready list.
//
//=================================
=========
DLLEXPORT _alias("THREAD ^SUSPEND") void Thread_Suspend ( );
//--------------------------------------------------------------------
----------
//
//      Suspend execution of the current thread, and place
the current
//      'Thread ^Struct' onto a specified LList. You MUST be
in
//      thread mode when you call this routine. You will
receive
//      control back eventually, after somebody places the
thread
//      back onto the ready list. [Presumably, he will find
that
//      thread by searching the list that you specify here.]
//
//=================================
```

-continued

SOURCE CODE MODULES

```
=========
DLLEXPORT _alias("THREAD^SUSPENDONLIST") void
Thread_SuspendOnList
   (
   LListHeader_Struct *ListHeader        // (i/o) The list onto
which to place the
                                         //       current thread.
);
//------------------------------------------------------------------------
----------
//
//      Suspend the current thread until a specified thread
has exited
//      its main procedure.
//
//      If, for any reason, it is possible for the current
thread to
//      lose interest in waiting, you may (via some other
thread) set
//      a global variable of your choosing, and then schedule
the
//      current thread. This will cause us to return early.
//
//      You must, via external mechanisms, ensure that the
thread upon
//      which you wish to wait still exists before you call
this routine.
//      The easiest way to do this is to have some kind of a
global
//      pointer to the target thread, and have the target
thread null
//      out this pointer before it exits. If you find that
pointer to
//      be null, don't call this routine.
//
//=================================
=========
DLLEXPORT _alias("THREAD^WAITFOREXIT") _variable Boolean
Thread_WaitForExit
   ( int_32 amask,
Thread_Struct *Thread,
                                   // (in) Thread on which to wait.
Boolean      *Quit                 // (in,opt) If provided, we will quit
waiting
                                   //       when this value becomes
'True' and
                                   //       the current thread is
scheduled.
/*Boolean*//*RESULT*/              // (out) True => the specified thread
                                   //           has terminated.
                                         False => wait was terminated
                                   //       by your 'Quit'
variable.
);
//------------------------------------------------------------------------
--------
// Thread_Start
//
//
//=================================
=========
void Thread_Start(ThreadImp_Struct *pThreadStruct);
#endif // _NTHREAD_H_
```

---

```
LISTING FOR CTHREADZ.CPP
#ifndef _NTHREAD_H_
#define _NTHREAD_H_
// include_path - changed rosgen.h to rosetta/rosgen.h in the
following
#pragma pack(push, one, 4)
#include "rosetta/rosgen.h" /* rosetta utilities */
#pragma pack(pop, one)
```

-continued

```
//#include "guardian/hgthread"    // SWE
#define _WIN32_WINNT 0x0400
#pragma pack(push, one, 4)
#ifndef _WINDOWS_
#include <windows.h>
#endif
#pragma pack(pop, one)
#define _WIN32_WINNT 0x0400
#pragma pack(push, one, 4)
#include <winbase . h>
#pragma pack(pop, one)
//#undef Exception
//#include <afx.h>
//-
//#include "tmf_s09/ngeneral.h"
#include "tmf_s08/nllistz.h"    // SWE
#include "tmf_s09/nlocalz.h"    // SWE
#ifndef _AITG_TESTING
#define _AITG_TESTING 0
#endif
#if !_AITG_TESTING
#undef _export_globals
#undef _global
#undef _value
#define _global extern
#define _value(x)
#endif/*_AITG_TESTING*/
//BLOCK Thread^Defs;
#define DLLEXPORT _declspec(dllexport)
//SWE - Start stuff From guardian\hgthread.bak
#define GTHREAD_BYTES(TSize, RSize)
        // swap area is not contiguous
#define GThread_CB(id) GThread_CB_Template *id
#define GThread_CB_Fields_Public
                                            \
        GThread_CB(LinkNext);           /* Reserved for thread
package*/                \
        GThread_CB(LinkPrev);           /*   (typically to link thread
on lists)*/         \
        int_32          GTh_Marker;     /* Eye-catcher & version word*/
                                            \
        GThread_CB(ThreadNext);         /* Links to next (younger)
and*/                    \
        GThread_CB(ThreadPrev);         /* previous (older) thread,*/
                \
                                        /* anchored in MainThread*/
                                            \
        unsigned_char   *StackOrigin;   /* Stack origin for thread*/
                                            \
        int_32          StackSize;      /* Stack size allocated
(bytes)*/           \
        unsigned_char   *SwapArea;      /* Swap area starting address,
or 0d*/             \
        unsigned_char   *StackStart;    /* Lowest address and bytes
used on*/           \
        int_32          StackUsed;      /*    primary stack*/
                                            \
        unsigned_char *PrivStart;       /* Lowest address and bytes
used on*/           \
        int_32          PrivUsed;       /* Priv stack in unpriv
native process*/
#define GThread_CB_Fields_Private fixed_0   GThread_Private
[19];// length must match structure in JGTHREAD
struct GThread_CB_Template {
    GThread_CB_Fields_Public
    GThread_CB Fields_Private
};
//SWE - End stuff From guardian\hgthread.bak
// The implementations of the items in this BLOCK should be
considered
// PRIVATE.
//-----------------------------------------------------------
----------
//
//      Thread^Struct  --   Public definition of a Thread.
//
//      Each thread is embodied by an occurrence of a
'Thread^Struct'.
//      A user of this module may use the LList module to
```

-continued

```
maintain
//      lists of threads that are not ready to run. However, note
//      that:
//      a.  Putting a 'Thread^Struct' onto a user-defined list has
//          the effect of making that thread NOT READY to run, and
//      b.  Scheduling a thread has the effect of automatically
//          removing the 'Thread^Struct' from whatever user-defined
//          list that the 'Thread^Struct' might be on.
//
//      A user should NEVER allocate a 'Thread^Struct' himself. These
//      are allocated implicitly by calling a procedure that contains
//      a 'THREAD^NEW[PARAMETERLESS]' define.
//
//=======================================================
DLLEXPORT class Thread_Struct
{
public:
    LListElement_Struct Links;          // Link words for putting this structure
                                        // onto a list.
    _redefarray(Word, Data, 0, -1, this[1]);   // Other stuff of a variable length, which
                                        // is private to this module.
};
typedef VOID (WINAPI *PTDM_START_ROUTINE) (
        int lpParameter1,
        int lpParameter2
        );
typedef PTDM_START_ROUTINE LPTDM_START_ROUTINE;
//-----------------------------------------------------
//
//          ThreadImp^Struct  --  Definition of a Thread.
//
//          A 'Thread^Struct' is exactly the public portion of this.
//
//=======================================================
DLLEXPORT struct ThreadImp_Struct
{
    union {
        GThread_CB_Template   GThreadCb;
        // Description of the thread, as far as the
        // 'GThread' module is concerned.
        LListElement_Struct   Links;
        // List links. These links are available for
        // scheduling purposes. A user of this module
        // may use the 'LList' module to place a thread
        // on any list, so that he knows when to
        // schedule it.
    };
    int_16                    EyeCatcher;
        // Always equal to 'Thread^EyeCatcher' ("TH").
union {
    Addr                      ParentThreadAddr;
    ThreadImp_Struct          *ParentThread;
    // Address of the thread that created us. If
    // our creator is threadless, this value is
    // 'Nil^Addr'.
};
union {
    Addr                      OwningHeapAddr;
    Word                      *OwningHeap;
    // The heap from which this 'ThreadImp^Struct'
    // was allocated, if it is to be freed.
    // 'Nil^Addr' if it came from the default
    // heap, and our ModuleInit was invoked with
    // 'NeverDispose' = 'True'.
};
```

-continued

```
unsigned_16                        ThreadIsComplete:1;
    // TRUE iff the thread has completed.
unsigned_16                        Reserved1:15;
    // Unused; always zero.
UnsignedInt                        WaiterCount;
    // The number of threads that are currently
    // waiting (inside 'Thread^WaitForExit') for
    // this thread to terminate. We cannot free
    // up the thread descriptor until this value
    // becomes zero.
LListHeader_Struct                 WaitList;
    // List of threads that are waiting for this
    // thread to complete. Each of these threads
    // will be awakened when this thread exits
    // from its main procedure.
    Addr                           ExceptionHandlerAddr;
    // Address of the thread's top exception handler
    void (*ContextSaveProc) (DblInt    ContextProcParam); //
Procedure to save context for this thread.
                                                                 //
('Nil^ProcAddr' if none.)
    void (*ContextRestoreProc) (DblInt    ContextProcParam); //
Procedure to restore context for this thread.
                                                                 //
    ('Nil^ProcAddr' if none.)
    DblInt          ContextProcParam;                  //
Parameter for 'ContextSaveProc' and
                                                                 //
'ContextRestoreProc'. Defaults to 'Nil^Addr'
    DblInt          SwapAreaByteLenDbl;                //
Current size of the thread's swap area,
                                                                 // in
bytes.
    int_16          SwapAreaIndex;                     //
Index of the SwapAreaList to/from which
                                                                 // our
current SwapArea could be put/gotten.
    int_16          Reserved2;                         //
Unused; always zero. Here for alignment.
    // Fields added for the Fibers port are below.
    LPTDM_START_ROUTINE    Proc;                       //
The procedure to execute.
    LPVOID          Fiber;                             //
The fiber that corresponds to this thread.
    DblInt          Param1;                            //
The first parameter to the fiber routine.
    DblInt          Param2;                            //
The second parameter to the fiber
                                                                 //
routine.
};
//------------------------------------------------------------
----------
//
//          ThreadG -- Global Data.
//
//          This data is placed into a single STRUCT to conserve
direct
//          global storage.
//
//============================================================
==========
DLLEXPORT struct _ThreadG
{
    union {
        Addr                       CurrentThreadAddr;
        ThreadImp_Struct           *CurrentThread;
        // Currently executing thread, or 'Nil^Addr'
        // if none.
    };
    union {
        Addr                       DebugThreadAddr;
        ThreadImp_Struct           *DebugThread;
        // Thread that we would like to get into
        // DEBUG, or 'Nil^Addr' if none.
    };
    LListHeader_Struct             Thread_ReadyList;
        // List of threads that are ready to run.
    LListHeader_Struct             Thread_DeferredReadyList;
```

-continued

```
        // List of threads that are ready to run,
        // but should be run AFTER the threads on
        // 'Thread^ReadyList'.
    union {
        Addr                    UndertakerThreadAddr;
        Word                    *UndertakerThread;
        // The thread descriptor of the undertaker
        // thread.
    };
    LListHeader_Struct          FreeThreadList;
        // List of threads that are available for
        // reuse.
    LListHeader_Struct          DeadThreadList;
        // List of dead threads that need to be
        // deallocated.
    LListHeader_Struct          FreeStackList;
        // List of 'ThreadStack^Struct's that are
        // available for reuse.
    Addr                        GlobalHandlerAddr;
        // While a thread is running, the address of
        // the top exception handler lives here.
    union {
        Addr                    HeapAddr;
        Word                    *Heap;
        // Heap to use.
    };
    Addr                        MinMainStackAddr;
    Addr                        MaxMainStackAddr;
        // The lower and upper bounds of addresses that
        // are within the execution area of a thread's
        // stack.
    Addr                        MinPrivStackAddr;
    Addr                        MaxPrivStackAddr;
        // The lower and upper bounds of addresses that
        // are withing the execution area of a thread's
        // privileged stack. If the process doesn't
        // have a separate priv stack, these are the
        // same as MinMainStackArea and MaxMainStackArea
        // A process doesn't have a separate stack if
        // either it is non-native mode, or its MAIN
        // procedure is PRIV.
    DblInt                      SwapAreaByteLenDbl;
        // Max context to save per thread.
    Boolean                     NeverDispose;
        // True iff we should not dispose threads
        // when we are done with them.
    Word                        Reserved1;
        // Unused, keeps things DblWord aligned.
    LListHeader_Struct          SwapAreaList[11];
        // Lists of free SwapArea's of various sizes.
        // The list at index [0] contains swap areas
        // of size 'SwapAreaByteLenDbl'. Each succeeding
        // list contains areas of twice the size of
        // the previous list's elements.
    GThread_CB_Template         MainCb;
        // Main control block for the 'GThread'
        // module.
    LPVOID                      Initial_Fiber;
        // Address of the initial fiber.
};
//--------------------------------------------------------------------
//
//          ScheduleOption Literals
//
//          These literals can be passed to 'Thread^Schedule' and
//          'Thread^ScheduleList'.
//====================================================================
enum {Normal_ScheduleOption = False};
                                    // Schedule thread at its
normal time.
enum {Defer_ScheduleOption = True};   // Schedule thread to run
after all normally
                                    // scheduled threads.
//END BLOCK;
#ifndef _AITG_TESTING
#define _AITG_TESTING 0
#endif
```

-continued

```
#if !__AITG__TESTING
#undef __global
#undef __value
#define __export_globals
#define __global
#define __value(x) = x
#endif/*__AITG__TESTING*/
//"Thread^Addr    --   Return the Addr of the current
'Thread^Struct'"
//------------------------------------------------------------
----------
//
//         If we are currently IN thread mode, return the 'Addr'
of the
//         current thread's 'Thread^Struct'.
//
//         If we are NOT currently in thread mode, return
'Nil^Addr'.
//
//============================================================
==========
DLLEXPORT __alias("THREAD^ADDR") Addr Thread__Addr( );
/*Addr*//*RESULT*/ // (out) Addr of the current
'Thread^Struct'.
//------------------------------------------------------------
----------
//
//         This procedure will determine whether a given 'Addr'
is within
//         the stack space of any thread. If it is, then that
address
//         CANNOT be used except while that thread is running.
//
//         'Nil^Addr' is assumed to NOT be within any thread's
stack.
//
//         This procedure is typically used in the idiom:
//
//              AssertTruth (NOT Thread^AddrIsInThread
(@ReferenceParam));
//
//============================================================
==========
DLLEXPORT __alias("THREAD^ADDRISINTHREAD") Boolean
Thread__AddrIsInThread
       (
       Addr    ObjectAddr    //   (in)     An address to check.
/*Boolean*//*RESULT*/   //   (out)    'False'   => the address is NOT
                        //                       within any thread
stack.
                        //            'True'    => the address IS
                        //                       within some thread
stack.
       );
//------------------------------------------------------------
----------
//
//         Thread^Create   --   Create a New Thread.
//
//         This procedure will create a new thread. The newly
created
//         thread will be ready to run. Control returns to the
caller
//         of 'Thread^Create' before the new thread has ever had
a chance
//         to run.
//
//         The new thread will execute by calling the
'ThreadProc' parameter,
//         passing 'Param1' through 'Param4'. If the new thread
ever returns
//         from its 'ThreadProc', the thread will be destroyed.
(This is the
//         only way to destroy a thread.)
//
//------------------------------------------------------------
----------
//
//         The 'ThreadProc' should be declared as:
```

-continued

```
//
//              PROC ThreadProc (Param1, Param2);
//
//              DblInt   Param1, Param2;
//              BEGIN . . . END;
//
//              If you like, you may declare either or both of the
params as
//              'Addr's instead of 'DblInt's.
//
//              The ThreadProc must always take exactly 2 32-bit
parameters,
//              whether it uses them or not.
//
//===========================================================
==========
DLLEXPORT _alias("THREAD^CREATE") _variable Addr Thread_Create
    (int_32 amask,
       procaddr   ThreadProc,  //  (in)      Top-level procedure for the
                               //            newly created thread.
       DblInt     Param1,      //  (in, opt)    'Param1' value to pass
to
                               //            the newly created thread.
If
                               //            omitted, we pass an
undefined value.
       DblInt     Param2,      //  (in, opt)    'Param2' value to pass
to
                               //            the newly created thread.
If
                               //            omitted, we pass an
undefined value.
       Word       *Heap        //  (in, opt)    Heap from which to
allocate the
                               //            'Thread^Struct'.
/*Addr*//*RESULT*/ // (out) Address of the newly created
thread.
);
//-----------------------------------------------------------
----------
//
//              Thread^DebugThread  --  Special Thread for Debugging
//
//              This procedure creates a thread that does nothing but
//              wake up once per second. This allows one to get a
server
//              process into DEBUG without having to take extra steps
to
//              get the process to wake up.
//
//              In order to use this thread, you must also use the
ThreadIo
//              module, and all of the machinery that that implies.
//
//              To get the benefits of this thread, just call this
procedure
//              after initializing the Thread and ThreadIo modules.
//
//===========================================================
==========
DLLEXPORT _alias("THREAD^DEBUGTHREAD") void
Thread_DebugThread( );
DLLEXPORT _alias("THREAD^DEBUGTHREADPROC") void
Thread_DebugThreadProc(
    DblInt   Param1,
    DblInt   Param2
    );
DLLEXPORT _alias("THREAD^DISPOSESWAPAREA") void
Thread_DisposeSwapArea(
         ThreadImp_Struct *Thread);
DLLEXPORT void Thread_SwapInAndRun(ThreadImp_Struct *Thread);
DLLEXPORT _alias("THREAD^UNDERTAKER") void Thread_Undertaker (
    DblInt   Param1, // (in)      Unused.
    DblInt   Param2 // (in)       Unused.
    );
DLLEXPORT _alias("THREAD^NEWSWAPAREA") void Thread_NewSwapArea
    (
    ThreadImp_Struct *Thread,
               //   (i/o)      Thread for which to allocate the
```

-continued

```
area.
        DblInt          MinByteLenDbl
                              //   (in)      Minimum size of the swap area,
                              //             in bytes.
            );
//--------------------------------------------------------------------
//
//          Give control to all threads that are ready to
execute.
//          You MUST NOT be in thread mode when you call this
routine.
//
//          You get control back from this procedure when there
are no
//          longer any threads that are ready to run.
//
//====================================================================
DLLEXPORT _alias("THREAD^DISPATCH") void Thread_Dispatch( );
//--------------------------------------------------------------------
//
//          This procedure retrieves the values previously
specified
//          by 'Thread^SetContextProc' for the current thread.
These are
//          the procedures that will be automatically called
whenever the
//          current thread is about to be suspended or
dispatched.
//
//          Note that due to the wonders of TAL, these procedure
variables
//          are returned as 'Word's. The word contains the code
space plus
//          PEP table index for the procedure. A value of zero
means none.
//          See "Usage Considerations" note 18 for more
information about
//          context procs. Most programs (even many that call
//          'Thread^SetContextProcs') will never have a need to
call
//          this procedure.
//
//====================================================================
DLLEXPORT _alias("THREAD^GETCONTEXTPROCS") _variable void
Thread_GetContextProcs
      ( int_32 amask,
        procaddr *ContextSaveProc,    //  (out,opt)    Procedure
descriptor of the
                                      //         procedure called to
SAVE the context
                                      //         for the current
thread. 'Nil^ProcAddr'
                                      //         is returned if no such
procedure exists
        procaddr *ContextRestoreProc,
                                      //  (out,opt)    Procedure
descriptor of the
                                      //         procedure called to
RESTORE the context
                                      //         for the current
thread. 'Nil^ProcAddr'
                                      //         is returned if no such
procedure
                                      //         exists.
        DblInt  *ContextProcParam     //  (out,opt)    Value being
passed to the
                                      //         ContextSaveProc and
ContextRestoreProc
                                      //         whenever they are
called.
            );
//--------------------------------------------------------------------
//
//          This procedure returns 'True' if we are IN thread
```

-continued

```
mode, and
//           returns 'False' otherwise.
//
//================================================================
==========
DLLEXPORT _alias("THREAD^ISACTIVE") Boolean Thread__IsActive( );
//----------------------------------------------------------------
----------
//
//           Initialize this module.
//
//================================================================
==========
DLLEXPORT _alias("THREAD^MODULEINIT") _variable void
Thread__ModuleInit
     (int__32 amask,
        Word *HeapToUse,      //   (in)     Heap to use for thread descriptor
                              //            allocation.
        int__16 ThreadStackSize,
                              //   (in)     A 'WordLen'. The number of
words of
                              //            stack data that will be saved for a
                              //            thread in one location. Threads
that
                              //            have more than this number of words
of
                              //            stack in use at the time of any call
                              //            to 'Thread^Suspend' will achieve
                              //            performance somewhat worse than
other
                              //            threads. Since RISC stacks are
about
                              //            3 times as big as T16 stacks, we
will
                              //            internally multiply this value by 3
if
                              //            we are executing in native mode.
        int__16 MaxStackGrowth,
                              //   (in)     A 'WordLen'. Maximum number of
words
                              //            that the stack can grow between this
                              //            call to 'Thread^ModuleInit' and
                              //            ANY call to 'Thread^Dispatcher'.
Since
                              //            RISC stacks are about 3 times as big
as
                              //            T16 stacks, we will internally
multiply
                              //            this value by 3 if we are executing
in
                              //            native mode.
        Boolean NeverDispose
                              //  (in, opt)   If present and 'True', this
                              //            module will never dispose of any
                              //            memory that it allocates. In stead,
                              //            it will save all memory for reuse
                              //            by itself only.
                              //            Defaults to FALSE.
);
//----------------------------------------------------------------
----------
//
//           This procedure returns the address of the thread that
//           created a given thread. If the subject thread way
created
//           by mainline code, we return 'Nil^Addr'.
//
//           Note that we give no guarantee whatsoever that the
parent thread
//           still exists. The caller probably needs to assure
this via
//           some independent mechanism.
//
//================================================================
==========
DLLEXPORT _alias("THREAD^PARENT") _variable Addr Thread__Parent
     (int__32 amask,
        Thread__Struct *Thread     //  (in, opt)  Thread whose parent is
desired.
```

-continued

```
                          //        Defaults to the current
thread.
/*Addr*//*RESULT*/   //   (out)     Address of the descriptor of the
                     //             thread's parent. 'Nil^Addr' if
none.
         );
//--------------------------------------------------------------------
//
//         Add 'Thread' to the list of threads ready to be run.
//
//====================================================================
DLLEXPORT __alias("THREAD^SCHEDULE") __variable void
Thread__Schedule
      (int__32 amask,
         Thread__Struct   *Thread,   //   (in)      Thread to schedule.
         Boolean          Defer      //   (in, opt) One of:
                                     //             'Normal^ScheduleOption'
(False) =>
                                     //             Run thread as soon
as
                                     //                convenient.
                                     //             'Defer^ScheduleOption'
(True) =>
                                     //             Run thread AFTER all
other
                                     //                ready threads have
run.
         );
//--------------------------------------------------------------------
//
//         Put every thread onto the ready list.
//
//====================================================================
DLLEXPORT __alias("THREAD^SCHEDULEALL") void
Thread__ScheduleAll( );
//--------------------------------------------------------------------
//
//         Schedule an entire list of threads for execution.
//         The list may be empty.
//
//====================================================================
DLLEXPORT __alias("THREAD^SCHEDULELIST") __variable void
Thread__ScheduleList
      ( int__32 amask,
         LListHeader__Struct *List,  //   (in)      List of threads to
schedule.
         Boolean          Defer      //   (in, opt) One of:
                                     //             'Normal^ScheduleOption'
(False) =>
                                     //             Run thread as
soon as
                                     //                convenient.
                                     //             'Defer^ScheduleOption'
(True) =>
                                     //             Run thread
AFTER all other
                                     //                ready threads
have run.
         );
//--------------------------------------------------------------------
//
//         This procedure lets you specify procedures that will
be
//         automatically called whenever the current thread is
about to
//         be dispatched or suspended. These procedures can
save and
//         restore global context for the thread. For example,
these
//         procedures could change the current user id, the
current
//         transaction, and/or the current trap handler.
```

-continued

```
//
//              The context routines are specified individually for
each thread;
//              When a thread first comes to life, it has no context
routines.
//              You may call 'Thread^SetContextProcs' more than once.
A subsequent
//              call completely replaces information from an earlier
call.
//
//              Each context procedure must be defined to take a
single DblInt
//              parameter, by value. You may specify this value in
the call
//              to 'Thread^SetContextProcs'.
//
//              See "Usage Considerations" note 18 for more
information about
//              the context procs. Most programs will not have a
need to
//              call this procedure.
//
//===========================================================
==========
DLLEXPORT _alias("THREAD^SETCONTEXTPROCS") _variable void
Thread_SetContextProcs
     ( int_32 amask,
       procaddr    ContextSaveProc,      //  (in, opt) Name of the
procedure to call
                                         //            to SAVE the context
for the current
                                         //            thread. This
procedure will be called
                                         //            whenever the current
thread is about
                                         //            to be suspended. If
omitted, then
                                         //            no procedure wiil be
called.
       procaddr    ContextRestoreProc,   //  (in, opt) Name of the
procedure to call
                                         //            to RESTORE the
context for the current
                                         //            thread. This
procedure will be called
                                         //            whenever the current
thread is about
                                         //            to be dispatched.
If omitted, then
                                         //            no procedure will be
called.
       DblInt      ContextProcParam      //  (in, opt) Value to pass to
the ContextSavePro
                                         //            ContextRestoreProc
whenever they are
                                         //            called. If omitted,
it defaults to
                                         //            'Nil^Addr'.
     );
//-----------------------------------------------------------
----------
//
//              Suspend execution of the current thread. You MUST be
in
//              thread mode when you call this routine. You will
receive
//              control back eventually, after somebody places the
thread
//              back onto the ready list.
//
//===========================================================
==========
DLLEXPORT _alias("THREAD^SUSPEND") void Thread_Suspend( );
//-----------------------------------------------------------
----------
//
//              Suspend execution of the current thread, and place
the current
//              'Thread^Struct' onto a specified LList. You MUST be
```

-continued

```
//          in
//          thread mode when you call this routine. You will receive
//          control back eventually, after somebody places the thread
//          back onto the ready list. [Presumably, he will find that
//          thread by searching the list that you specify here.]
//
//==============================================================
DLLEXPORT _alias("THREAD^SUSPENDONLIST") void Thread_SuspendOnList
     (
  LListHeader_Struct   *ListHeader   //  (i/o)     The list onto which to place the
                                     //            current thread.
         );
//--------------------------------------------------------------
//
//          Suspend the current thread until a specified thread has exited
//          its main procedure.
//
//          If, for any reason, it is possible for the current thread to
//          lose interest in waiting, you may (via some other thread) set
//          a global variable of your choosing, and then schedule the
//          current thread. This will cause us to return early.
//
//          You must, via external mechanisms, ensure that the thread upon
//          which you wish to wait still exists before you call this routine.
//          The easiest way to do this is to have some kind of a global
//          pointer to the target thread, and have the target thread null
//          out this pointer before it exits. If you find that pointer to
//          be null, don't call this routine.
//
//==============================================================
DLLEXPORT _alias("THREAD^WAITFOREXIT") _variable Boolean Thread_WaitForExit
     ( int_32 amask,
       Thread_Struct   *Thread,
                       //  (in)      Thread on which to wait.
       Boolean         *Quit    //  (in, opt)   If provided, we will quit waiting
                                //            when this value becomes 'True' and
                                //            the current thread is scheduled.
/*Boolean*//*RESULT*/  //  (out)     True =>    the specified thread
                                                has terminated.
                       //            False =>   wait was terminated
                       //                       by your 'Quit' variable.
     );
//--------------------------------------------------------------
//   Thread_Start
//
//
//==============================================================
void Thread_Start(ThreadImp_Struct *pThreadStruct);
     #endif   //   _NTHREAD_H_
```

What is claimed is:

1. A computer program product to be executed on a computer including a central processing unit (CPU) and memory, with operating system code, user program code, and a shared code module stored in memory, with the computer for executing the user program stored in memory, and with the operating system for preemptively scheduling operating system threads of execution and implementing subsets of fibers for each thread, where the fibers are not scheduled by operating system, and with the user program originally running as an initial thread scheduled by the operating system, and with the computer product including:

a computer usable storage structure having executable program code embodied therein, with said program coding including:

computer program code for implementing an initialize routine for converting the initial operating system thread to a fiber designated an initial shared code thread;

computer program code for implementing a create routine for creating additional fibers as shared code threads, where all shared code threads are fibers which are a subset of a single parent operating system thread and for creating a structure in memory representing each shared code thread, with the structure including indications of a thread address specifying an address of the shared code thread utilized by the operating system and of the user-specified procedure;

computer program code implementing a start program utilized with threads, with the start program called by the operating system when a thread is scheduled for CPU time, with the start program calling a main function defining the functionality of the shared code thread and calling a thread afterlife function when the main program returns to the calling start program so that the start program never returns to cause the parent thread to exit prematurely, and with the start program including program code for:

executing said thread afterlife program, subsequent to the main program returning, which determines whether the specified thread is to be reused or deleted when the user-specified program returns.

2. The computer program product recited in claim 1 further comprising:

program code for creating a never_dispose variable, stored in memory, set true by the user program if the specified shared code thread is to be reused when it completes.

3. The computer program product recited in claim 2 further comprising:

a thread initialize module, stored in memory, for creating an address of said initial shared code thread stored as a global variable and a second shared code thread which is an undertake shared code thread responsible for deleting shared code threads when their main functions returns and the shared code thread is not to be reused.

4. The computer program product of claim 3 further comprising:

a ready_list, deferred_list, a deadthread_list, and a freethread_list stored in memory;

where said thread afterlife function places the current shared code thread either on the freethread_list if the never_dispose variable is true and the current shared code thread is to be reused or on the deadthread_list if the never_dispose variable is false and the current shared code thread is to be deleted;

a thread_dispatch function, stored in memory, included in the structure associated with the initial shared code thread, including program code responsive to a user program request to transfer control to runnable shared code threads and for:

first, checking said ready_list, and running shared code threads included in the ready_list, and;

second, checking said deferred_list and running shared code threads included in said deferred_list.

5. The computer program product of claim 4 further comprising:

a thread_dispose function, stored in memory, included a structure associated with said shared code undertaker thread, for deleting all shared code threads included in said dead thread list when executed;

where the afterlife function associated with the undertake shared code thread places the undertaker shared code thread in said deferred list so that the thread_dispose function will run only after all runnable shared code threads in said ready_list have suspended or completed.

\* \* \* \* \*

UNITED STATES PATENT AND TRADEMARK OFFICE
CERTIFICATE OF CORRECTION

PATENT NO. : 6,189,023 B1  
DATED : February 13, 2001  
INVENTOR(S) : Emlich et al.

Page 1 of 1

It is certified that error appears in the above-identified patent and that said Letters Patent is hereby corrected as shown below:

<u>Title page,</u>
Item "[56] References Cited",
Line 2, reads: "5,404,529 * 4/1995 Chernikoff." It should read: -- 5,404,529 * 4/1995 Chernikoff et al..--;
Line 3, reads: "5,481,706 * 1/1996 Peck." It should read: -- 5,481,706 * 1/1996 Peek. --;
Line 5, reads: "5,557,747 * 9/1996 Roger." It should read: -- 5,557,747 * 9/1996 Rogers et al.. --;
Line 6, reads: 5,630,128 * 5/1997 Farrell." It should read: -- 5,630,128 * 5/1997 Farrell et al. --;
Line 7, reads: "5,784,613 * 7/1998 Iamirisa." It should read: -- 5,784,613 * 7/1998 Tamirisa. --;

<u>Column 76, claim 5,</u>
Line 36, reads: "where the afterlife function associated with the undertake", it should read: -- where the afterlife function associated with the undertaker --

Signed and Sealed this

Twenty-sixth Day of February, 2002

Attest:

*Attesting Officer*

JAMES E. ROGAN  
*Director of the United States Patent and Trademark Office*